(12) United States Patent
Isomura

(10) Patent No.: US 9,834,078 B2
(45) Date of Patent: Dec. 5, 2017

(54) POWER TRANSMISSION APPARATUS FOR VEHICLE

(71) Applicant: Toyota Jidosha Kabushiki Kaisha, Toyota-shi, Aichi-ken (JP)

(72) Inventor: Haruo Isomura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 412 days.

(21) Appl. No.: 14/490,240

(22) Filed: Sep. 18, 2014

(65) Prior Publication Data
US 2015/0082929 A1    Mar. 26, 2015

(30) Foreign Application Priority Data

Sep. 25, 2013  (JP) ................................. 2013-197763

(51) Int. Cl.
| | |
|---|---|
| *F16D 3/68* | (2006.01) |
| *B60K 1/00* | (2006.01) |
| *F16H 3/08* | (2006.01) |
| *F16H 3/72* | (2006.01) |
| *F16D 1/10* | (2006.01) |
| *F16H 37/08* | (2006.01) |

(52) U.S. Cl.
CPC ................ *B60K 1/00* (2013.01); *F16D 1/10* (2013.01); *F16D 3/68* (2013.01); *F16H 3/08* (2013.01); *F16H 3/727* (2013.01); *F16D 2001/103* (2013.01); *F16D 2300/22* (2013.01); *F16H 2037/0866* (2013.01); *F16H 2200/2005* (2013.01); *Y10T 74/19233* (2015.01)

(58) Field of Classification Search
CPC ............... F16D 3/005; F16D 3/74; F16D 3/68
See application file for complete search history.

(56) References Cited

U.S. PATENT DOCUMENTS 4,950,101 A  *  8/1990  Artzberger .............. E01C 19/40
                                                      403/359.6
5,435,784 A  *  7/1995  Mark ...................... F16D 1/096
                                                          464/182
(Continued)

FOREIGN PATENT DOCUMENTS

JP      60-026331 U1    2/1985
JP      2003-222153 A   8/2003
(Continued)

*Primary Examiner* — William Kelleher
*Assistant Examiner* — Gregory Prather
(74) *Attorney, Agent, or Firm* — Dinsmore & Shohl LLP

(57) ABSTRACT

A power transmission apparatus includes a first/second/third rotary shaft, and a positioning member. The first rotary shaft is connected to an output shaft of a drive source. The second rotary shaft is spline-fitted to a rotary shaft of an electric motor. The third rotary shaft is connected to the first rotary shaft and the second rotary shaft. The positioning member is configured to apply an elastic force in a rotational direction to the rotary shaft and the second rotary shaft in a portion where the rotary shaft and the second rotary shaft overlap each other; set each of a position in the rotational direction of a spline of the rotary shaft of the electric motor and a spline of the second rotary shaft to a specified position, and applies the elastic force in the rotational direction to the rotary shaft and the second rotary shaft.

11 Claims, 14 Drawing Sheets

(56) References Cited

U.S. PATENT DOCUMENTS

| | | | | |
|---|---|---|---|---|
| 6,322,407 | B1* | 11/2001 | Onoue | B63H 20/20 440/52 |
| 2010/0304907 | A1* | 12/2010 | Yuan | F16D 3/74 474/161 |
| 2012/0202605 | A1* | 8/2012 | Cassell | F16D 3/223 464/85 |
| 2012/0255396 | A1* | 10/2012 | Murata | B60K 6/36 74/661 |
| 2014/0116608 | A1* | 5/2014 | Sato | F16D 3/68 156/245 |
| 2016/0146262 | A1* | 5/2016 | Kogure | F16D 3/12 180/444 |

FOREIGN PATENT DOCUMENTS

| | | |
|---|---|---|
| JP | 2010-070044 A | 4/2010 |
| JP | 2011-214646 A | 10/2011 |
| WO | 2011074042 A1 | 6/2011 |

* cited by examiner

POWER TRANSMISSION APPARATUS FOR VEHICLE

INCORPORATION BY REFERENCE

The disclosure of Japanese Patent Application No. 2013-197763 filed on Sep. 25, 2013 including the specification, drawings and abstract is incorporated herein by reference in its entirety.

BACKGROUND OF THE INVENTION

1. Field of the Invention

The present invention relates to a power transmission apparatus for a vehicle.

2. Description of Related Art

A mechanism capable of reducing noise in a spline-fitting section that connects a rotary shaft of an electric motor and a drive shaft (rotary shaft) has been known (see Japanese Patent Application Publication No. 2011-214646 (JP 2011-214646 A), for example).

The mechanism that is disclosed in JP 2011-214646 A above includes a drive source (an engine), a generator, and an electric motor as primary components. The rotary shaft of the electric motor is spline-fitted to the drive shaft that is coaxially arranged. The drive shaft is indirectly connected to the drive source. The drive shaft is configured such that output torque of the drive source is transmitted thereto.

An inner spline is formed on an inner peripheral side at an end of the rotary shaft of the electric motor. An outer spline is formed on an outer peripheral side at an end of the drive shaft. The inner spline of the rotary shaft in the electric motor and the outer spline of the drive shaft are connected (spline-fitted) to each other.

An O-ring is provided for an entire circumference in a portion in which the end of the rotary shaft in the electric motor and the end of the drive shaft overlap each other and that is other than the spline-fitting section.

In a case where the electric motor does not output torque (or outputs minute torque), a fluctuation in torque (a fluctuation in rotation) that is output by the drive source causes abutment of a gear pair that is arranged upstream of the spline-fitting section in a torque transmission path, and further causes generation of the noise when the inner spline of the rotary shaft in the electric motor abuts against the outer spline of the drive shaft. At this time, the O-ring, which is provided between the rotary shaft in the electric motor and the drive shaft, alleviates shock, and the noise is thereby reduced (suppressed).

SUMMARY OF THE INVENTION

In a structure that is disclosed in JP 2011-214646 A above, when the electric motor outputs torque and the rotary shaft transmits torque, the O-ring, which is provided between the rotary shaft in the electric motor and the drive shaft, slides in a rotational direction. After transmission of the torque is stopped, the inner spline of the rotary shaft in the electric motor is retained in a state that it abuts against one side of the outer spline of the drive shaft in the rotational direction. If the drive source outputs the torque in this state, the torque is transmitted to the rotary shaft of the electric motor via the gear pair that is arranged upstream of the spline-fitting section in the torque transmission path (the gear pair that is provided between the drive source and the drive shaft). At this time, since the inner spline of the rotary shaft in the electric motor abuts against the outer spline of the drive shaft, a shock-absorbing effect of the O-ring may not be exerted. Consequently, the torque output by the drive source (a fluctuation in rotation) may cause generation of the noise in the gear pair, which is arranged upstream of the spline-fitting section in the torque transmission path.

In consideration of assemblability, rubber or a soft resin is suited for a material used for the O-ring in the above structure. However, since an elastic force of rubber or a resin varies by temperature, the stable shock-absorbing effect may not be obtained. Furthermore, the shock-absorbing effect is exerted in the above structure by deformation (the elastic force) of the O-ring, sliding between the rotary shaft of the electric motor and the O-ring, and sliding between the O-ring and the drive shaft. Accordingly, depending on a force that is input to the O-ring, the shock-absorbing effect differs in an area where the shock-absorbing effect is exerted only by the deformation (elastic force) of the O-ring from an area where the shock-absorbing effect is exerted by the deformation (elastic force) of the O-ring, the sliding between the rotary shaft of the electric motor and the O-ring, and the sliding between the O-ring and the drive shaft. Thus, the stable shock-absorbing effect may not be obtained.

The present invention provides a power transmission apparatus for a vehicle capable of suppressing noise of a gear pair that is arranged upstream of a spline-fitting section in a torque transmission path.

A first aspect of the present invention is a power transmission apparatus for a vehicle, the power transmission apparatus includes a first rotary shaft, a second rotary shaft, a third rotary shaft, and a positioning member. The first rotary member is connected to an output shaft of a drive source in a manner capable of integral rotation. The second rotary shaft is spline-fitted to a rotary shaft of an electric motor. The third rotary shaft is connected to each of the first rotary shaft and the second rotary shaft. The third rotary shaft coupled to a drive wheel. The third rotary shaft connected to the second rotary shaft via a gear pair. The positioning member (i) applies an elastic force in a rotational direction to the rotary shaft of the electric motor and the second rotary shaft in a portion where the rotary shaft of the electric motor and the second rotary shaft overlap each other, (ii) is arranged to set a position in the rotational direction of a spline of the rotary shaft of the electric motor and a spline of the second rotary shaft to a specified position, and applies the elastic force in the rotational direction to the rotary shaft of the electric motor and the second rotary shaft such that the spline of the rotary shaft of the electric motor and the spline of the second rotary shaft are restored to the specified position.

In the power transmission apparatus, an inner spline may be formed on an inner peripheral side of the rotary shaft of the electric motor, and an outer spline that is fitted to the inner spline may be formed on an outer peripheral side of the second rotary shaft. The positioning member may be arranged to set a position in the rotational direction of the inner spline of the rotary shaft of the electric motor and the outer spline of the second rotary shaft to a specified position, and may be configured to apply the elastic force in the rotational direction to the inner spline of the rotary shaft of the electric motor and the outer spline of the second rotary shaft such that the inner spline of the rotary shaft of the electric motor and the outer spline of the second rotary shaft are restored to the specified position.

In the power transmission apparatus, the positioning member may have a shock-absorbing section that is formed to extend along a radial direction of the rotary shaft. At least one of a surface of the second rotary shaft and a surface of the rotary shaft of the electric motor that face each other may be formed with a positioning member attachment section with which at least one of an end on an axis side and an end on an opposite side of the axis along a radial direction of the shock-absorbing section is engaged.

In the power transmission apparatus, the positioning member may have a ring section and the shock-absorbing section that extends from a portion of the ring section along both of the axis side and the opposite side of the axis. An inner peripheral surface of the rotary shaft of the electric motor may include a first positioning member attachment section with which the end on the opposite side of the axis of the shock-absorbing section is engaged. An outer peripheral surface of the second rotary shaft may include a second positioning member attachment section with which the end on the axis side of the shock-absorbing section is engaged.

In the power transmission apparatus, the positioning member may include the ring section and the shock-absorbing section that project from the portion of the ring section along one of the axis side and the opposite side of the axis. One of the outer peripheral surface of the second rotary shaft and the inner peripheral surface of the rotary shaft of the electric motor may include the positioning member attachment section with which the shock-absorbing section is engaged. The ring section may be press-fitted to another of the outer peripheral surface of the second rotary shaft and the inner peripheral surface of the rotary shaft of the electric motor.

In the power transmission apparatus, the ring section of the positioning member may be interposed for an entire periphery of the portion other than a spline-fitting section where the rotary shaft of the electric motor and the second rotary shaft overlap each other.

In the power transmission apparatus, the inner spline of the rotary shaft in the electric motor may include a first projection. The outer spline of the second rotary shaft may include a second projection. The first projection and the second projection may be arranged via a first space and a second space between the first projection and the second projection. The first projection and the second projection may move to a side on which the size of the first space is reduced and may abut against each other when the drive source drives the drive wheel in a first rotational direction. The first projection and the second projection may move to a side on which the size of the second space is reduced and may abut against each other when the drive source drives the drive wheel in a second rotational direction that is opposite from the first rotational direction. The positioning member may be arranged in a position where each of the size of the first space and the size of the second space is set to a specified size, and the positioning member may apply the elastic force in the rotational direction to the rotary shaft of the electric motor and the second rotary shaft such that the rotary shaft of the electric motor and the second rotary shaft are restored to a position where the size of the first space and the size of the second space each becomes the specified size.

In the power transmission apparatus, the positioning member may be arranged such that the size of the first space becomes substantially equal to the size of the second space, the first space and the second space being defined between the spline of the rotary shaft of the electric motor and the spline of the second rotary shaft. The positioning member may apply the elastic force in the rotational direction to the rotary shaft of the electric motor and the second rotary shaft such that the rotary shaft of the electric motor and the second rotary shaft are each restored to a position where the size of the first space becomes substantially equal to the size of the second space.

In the power transmission apparatus, in a case where a fluctuation in output torque at a time when the drive source drives the drive wheel in the first rotational direction is larger than a fluctuation in output torque at a time when the drive source drives the drive wheel in the second rotational direction, the positioning member may be arranged in a position where the first space becomes larger than the second space, and may apply the elastic force in the rotational direction to the rotary shaft of the electric motor and the second rotary shaft such that the rotary shaft of the electric motor and the second rotary shaft are each restored to a position where the size of the first space becomes larger than the size of the second space.

In the power transmission apparatus, the positioning member may be an elastic member that applies the elastic force in the rotational direction to the rotary shaft of the electric motor and the second rotary shaft such that the spline of the rotary shaft of the electric motor and the spline of the second rotary shaft are restored to the specified position in the rotational direction.

As described above, according to the power transmission apparatus for a vehicle of the present invention, it is possible to suppress rattling noise of the gear pair that is arranged upstream of the spline-fitting section in a torque transmission path.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A description will hereinafter be made on embodiments of the present invention on the basis of the drawings.

Figure 1:
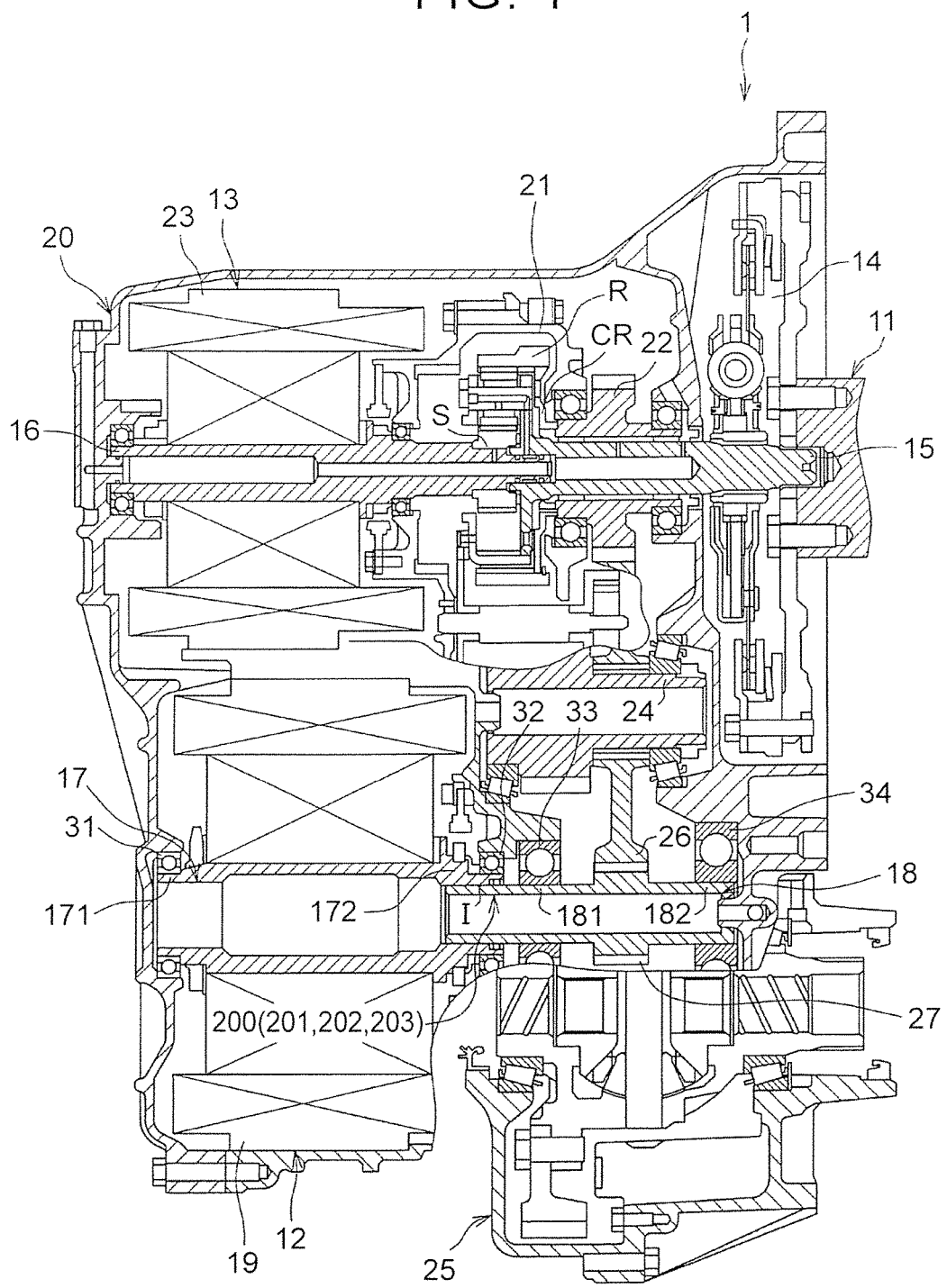
FIG. 1 is a cross-sectional view of a hybrid drive apparatus according to a first embodiment of the present invention that is taken along a plane including each axis.

A first embodiment will be described with reference to FIG. 1 to FIG. 7. As shown in FIG. 1, a hybrid drive apparatus (power transmission apparatus for a vehicle) 1 according to the first embodiment includes an engine as a drive source (in FIG. 1, a rear end of a crankshaft 11 of the engine is shown in an upper right section), a motor (an electric motor) 12, and a generator 13.

An output shaft 15 is connected to the crankshaft 11 via a drive plate 14. The output shaft 15 is coaxially arranged with a rotor shaft (first rotary shaft) 16 of the generator 13.

A rotor shaft (rotary shaft) 17 capable of transmitting torque is arranged on an inner side (axial side) of the motor 12. This rotor shaft 17 of the motor 12 is connected to a drive shaft (second rotary shaft) 18 by spline-fitting, which will be described later. The rotor shaft 17 of the motor 12 and the drive shaft 18 are coaxially arranged. A stator 19 is arranged on an outer side (an opposite side of the axis) of the rotor shaft 17 in the motor 12. This stator 19 is fixed to a case 20.

The output shaft 15 and the rotor shaft 16 of the generator 13 are connected via a single pinion planetary gear 21. A carrier CR of the planetary gear is connected to the output shaft 15. A sun gear S is connected to the rotor shaft 16 of the generator 13. A ring gear R is connected to a drive gear 22 on an engine side that is supported by the output shaft 15 in a freely rotatable manner. A stator 23 is arranged on the outer side of the rotor shaft 16 of the generator 13. This stator 23 is fixed to the case 20.

The hybrid drive apparatus 1 allows traveling of the vehicle only by output of the motor 12 due to the planetary gear 21. In addition, a vehicle can travel while a ratio of dividing engine output between drive power and electric power generating energy is appropriately adjusted in accordance with output states of the engine and the motor 12.

A countershaft (third rotary shaft) 24 capable of transmitting torque is arranged (connected) between the output shaft 15 and the drive shaft 18. This countershaft 24 is connected to wheels (drive wheels), which are not shown, via a differential device 25.

A motor-side driven gear 26 is fixed to the countershaft 24. This motor-side driven gear 26 meshes with a motor-side drive gear 27 (power transmission gear) that is integrally provided with the drive shaft 18. Accordingly, torque output from the engine is transmitted to a spline-fitting section I in which an outer spline 183 of the drive shaft 18 is fitted to an inner spline 173 of the rotor shaft 17 of the motor 12 via the motor-side driven gear 26 of the countershaft 24 and the drive shaft 18 that is provided with the motor-side drive gear 27. Here, the motor-side driven gear 26 and the motor-side drive gear 27 are an example of the "gear pair" of the present invention. The motor-side driven gear 26 and the motor-side drive gear 27 are each formed of a gear such as a helical gear.

Figure 2:
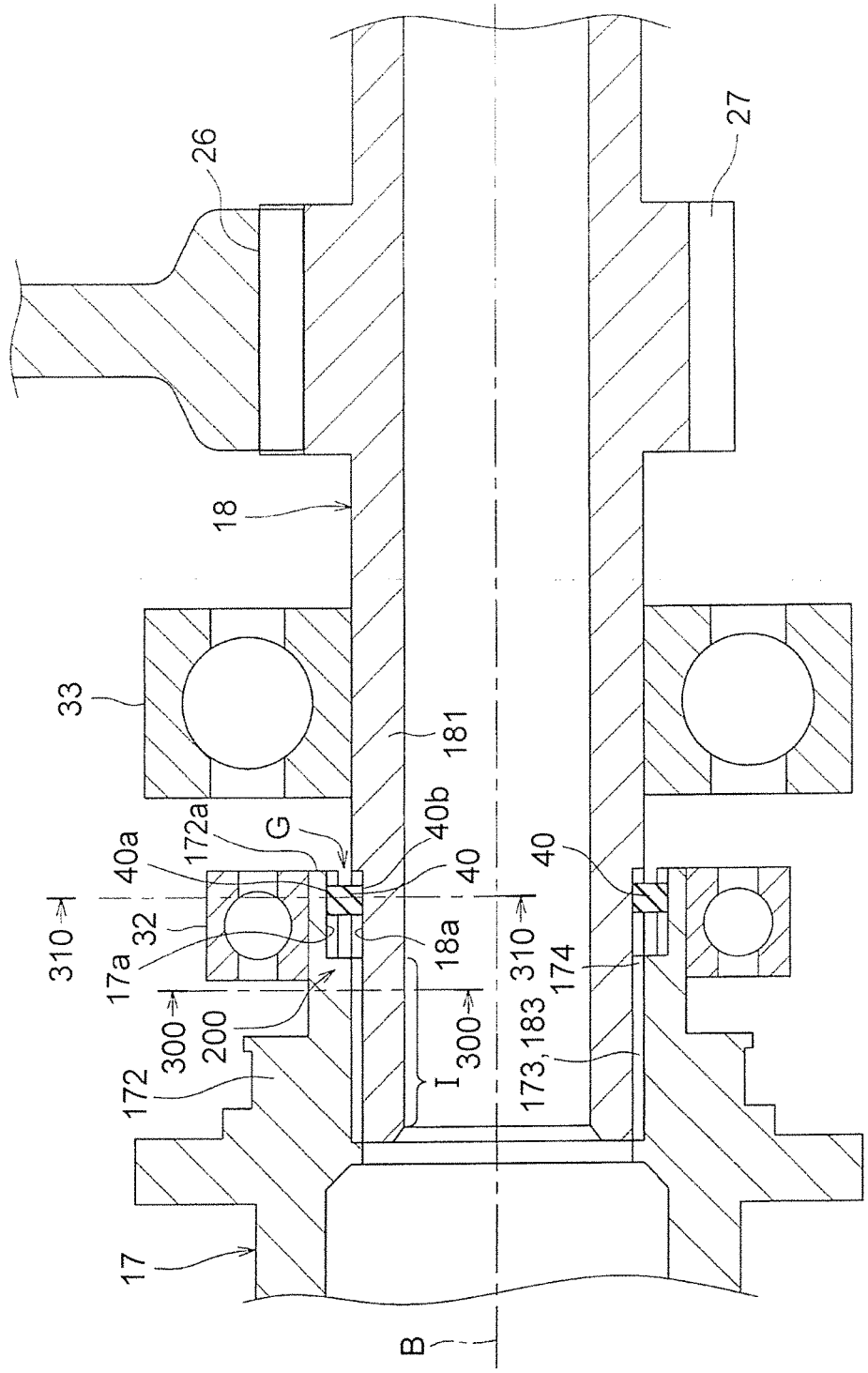
FIG. 2 is a cross-sectional view according to the embodiment that is taken along a plane including a rotor shaft of a motor and a drive shaft.

As shown in FIG. 1 and FIG. 2, the rotor shaft 17 of the motor 12 is formed in a substantially cylindrical shape. Outer peripheral surfaces of one end 171 and another end 172 in an axial direction (a direction along an axis B in FIG. 2) of the rotor shaft 17 in the motor 12 are respectively supported by bearings 31, 32 in a freely rotatable manner. These bearings 31, 32 are fixed to the case 20.

The drive shaft 18, which is coaxially arranged with the rotor shaft 17 of the motor 12, is formed in a substantially cylindrical shape. Outer peripheral surfaces of one end 181 and another end 182 in an axial direction of the drive shaft 18 are respectively supported by bearings 33, 34 in a freely rotatable manner. These bearings 33, 34 are fixed to the case 20.

Next, a spline positioning mechanism 200 will be described. As shown in FIG. 2, an inner peripheral side of the other end 172 of the rotor shaft 17 in the motor 12 is connected to an outer peripheral side of the one end 181 of the drive shaft 18 via the spline-fitting section I. More specifically, an inner peripheral surface of the other end 172 of the rotor shaft 17 in the motor 12 is formed with an inner spline 173. Meanwhile, an outer peripheral surface of the one end 181 of the drive shaft 18 is formed with an outer spline 183. The spline-fitting section I is configured in a portion where both of the shafts overlap each other by fitting the inner spline 173 and the outer spline 183 to each other. As shown in FIG. 1, the bearing 32 that supports the other end 172 of the rotor shaft 17 is arranged on an outer peripheral side of the inner spline 173.

Figure 4:
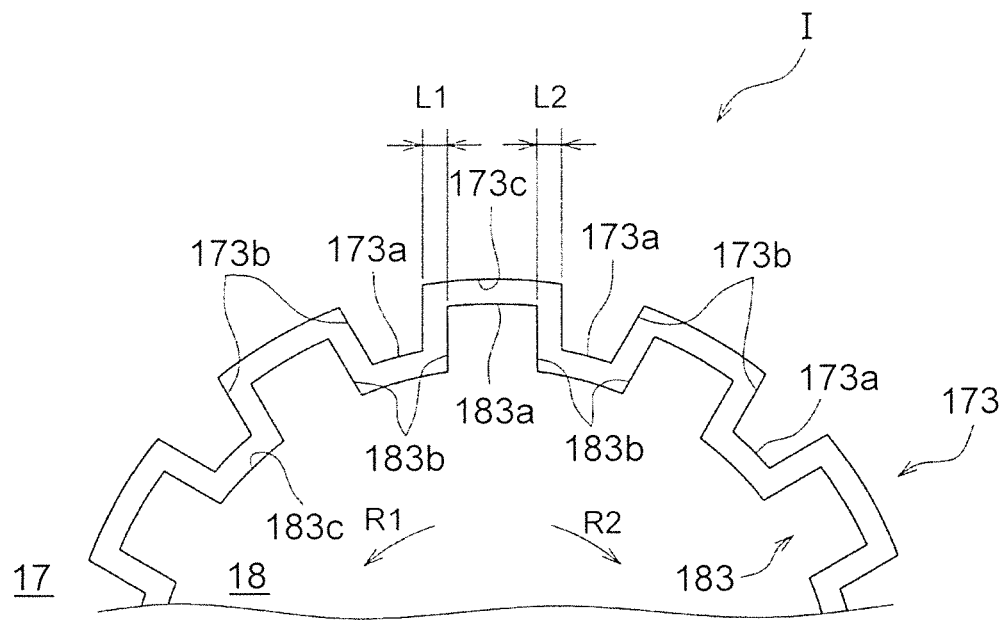
FIG. 4 is a cross-sectional view that is taken along the line 300-300 in FIG. 2, and is a view for showing a state that the size of a first space L1 is substantially equal to the size of a second space L2.

As shown in FIG. 4, in a state that the rotor shaft 17 of the motor 12 or the drive shaft 18 does not transmit torque in either a first rotational direction R1 or a second rotational direction R2 (a state that rotation is stopped), a first space L1 (a space in a direction along the first rotational direction R1) between a recess 173c of the inner spline 173 of the rotor shaft 17 and a projection 183a (tooth) of the outer spline 183 of the drive shaft 18 is substantially equal to a second space L2 (a space in a direction along the second rotational direction R2).

In other words, the projection 183a of the outer spline 183 of the drive shaft 18 is arranged (centered) (at the substantial center) between a projection 173a of the inner spline 173 of the rotor shaft 17 in the motor 12 and another projection 173a of the inner spline 173 of the rotor shaft 17 in the motor 12.

The first rotational direction is, for example, a direction in which the engine is rotated when the engine drives the drive wheels in a forward traveling direction. The second rotational direction is, for example, a direction in which the engine is rotated when the engine drives the drive wheels in a reverse traveling direction. Depending on a specification of the apparatus, a relationship of the rotational directions just as described may be reversed.

Figure 3:
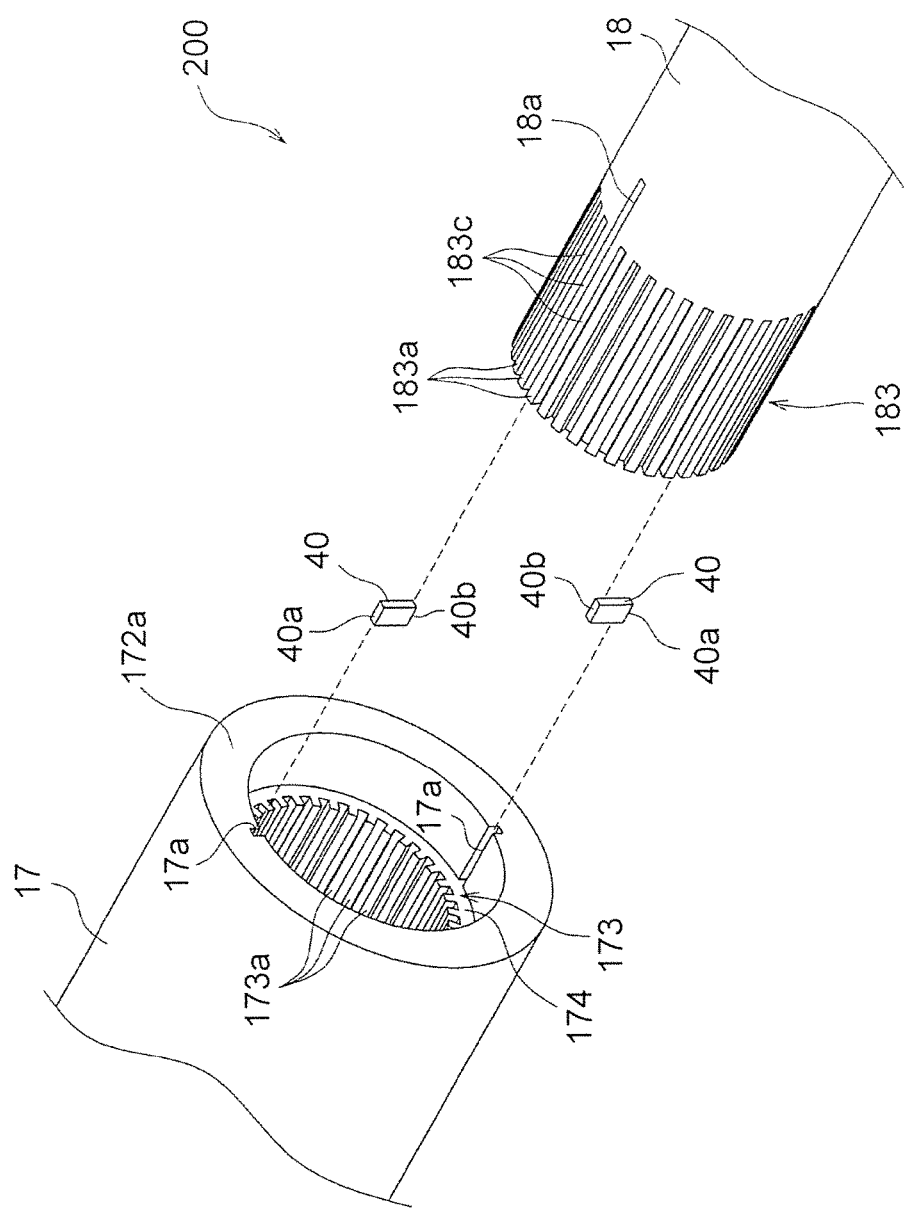
FIG. 3 is a perspective view (schematic view) for showing the rotor shaft of the motor, a key section, and the drive shaft according to the embodiment.

As shown in FIG. 2 and FIG. 3, the other end 172 of the rotor shaft 17 is provided with an extended section 172a. The extended section 172a is formed to further extend the other end 172 along the axis B from an end 174 of the inner spline 173. An inner peripheral surface of this extended section 172a is formed with positioning member attachment sections 17a to which two key sections (positioning members or shock absorbing sections) 40, each of which is formed of an elastic member and which will be described later, are attached. The outer peripheral surface of the one end 181 of the drive shaft 18, which faces the positioning member attachment section 17a, is formed with positioning member attachment sections 18a to which the two key sections 40 are attached. The positioning member attachment section 17a and the positioning member attachment section 18a are arranged with a specified gap G therebetween. These positioning member attachment sections 17a, 18a are each configured of a groove, a notch, or the like that is formed along the axial direction B. As shown in FIG. 3, in this embodiment, an example is shown in which the positioning member attachment section 18a is formed on an extension line (the axial direction) of a recess 183c of the drive shaft 18. However, the positioning member attachment section 18a may be formed in a portion other than the extension line of the recess 183c of the drive shaft 18. Alternatively, the positioning member attachment section 18a may be formed separately from the recess 183c of the drive shaft 18.

Figure 5:
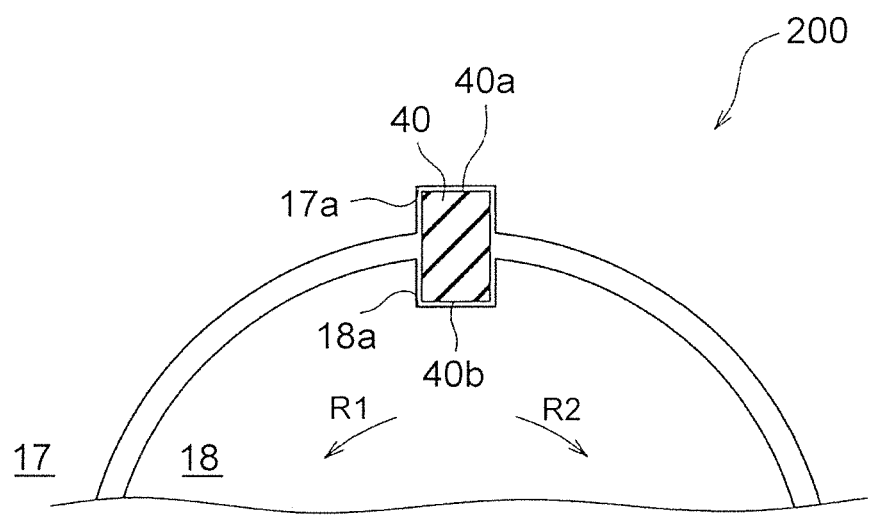
FIG. 5 is a cross-sectional view that is taken along the line 310-310 in FIG. 2.

As shown in FIG. 2, FIG. 3, and FIG. 5, the two key sections 40, each of which is attached (engaged) between the positioning member attachment section 17a and the positioning member attachment section 18a, each have a rectangular shape (square pole shape) that extends from the axis to the outer side when seen in a radial direction or in the axial direction B. As shown in FIG. 5, a specified space is provided between an outer end (an end on an opposite side of the axis) 40a of the key section 40 and the positioning member attachment section 17a of the rotor shaft 17. A specified space is provided between an inner end (an end on the axis side) 40b of the key section 40 and the positioning member attachment section 18a of the drive shaft 18. In this embodiment, an example is shown in which the two key sections 40 are provided. However, one, three, or more of the key sections may be provided.

When the key section 40 is in a normal state (a state that it is neither bent nor deformed), as shown in FIG. 4, the space L1 is substantially equal to the space L2, the space L1 and the space L2 being formed between the projection 173a (a tooth) of the inner spline 173 of the rotor shaft 17 in the motor 12 and the projection 183a (a tooth) of the outer spline 183 of the drive shaft 18.

Next, with reference to FIG. 4 to FIG. 7, a description will be made on an operation of the key section 40 when the motor 12 outputs torque and the rotor shaft 17 transmits the torque.

As shown in FIG. 4, in a state before the motor 12 outputs torque, the space L1 is substantially equal to the space L2, the space L1 and the space L2 being formed between the projection 173a (tooth) of the inner spline 173 of the rotor shaft 17 in the motor 12 and the projection 183a (tooth) of the outer spline 183 of the drive shaft 18. At this time, as shown in FIG. 5, the key section 40 is neither bent nor deformed.

Figure 6:
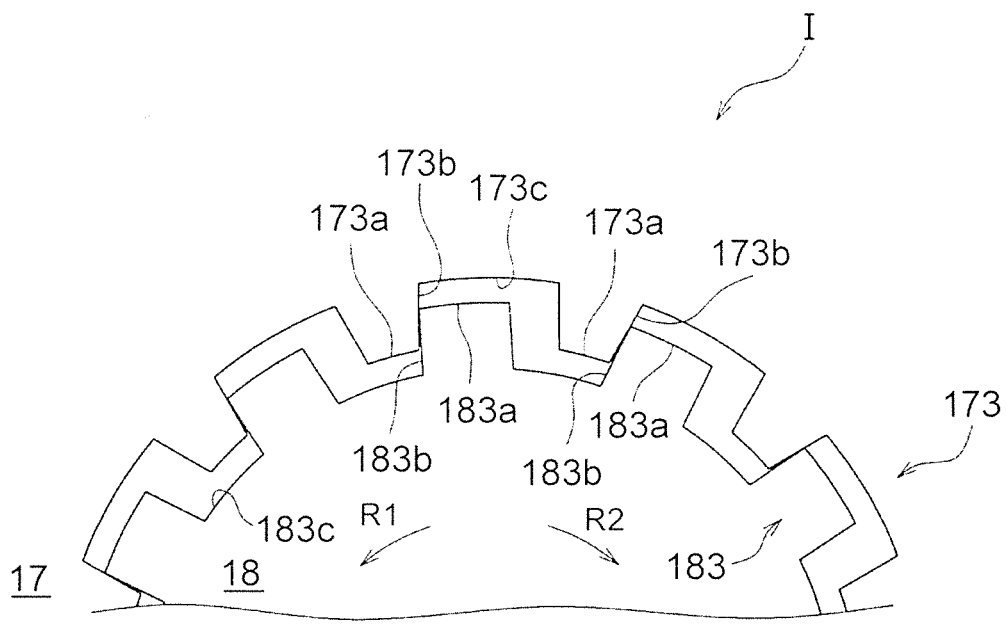
FIG. 6 is a view according to the embodiment for showing a state that an inner spline of the rotor shaft of the motor and an outer spline of the drive shaft abut against each other.

Next, as shown in FIG. 6, when the motor 12 outputs torque, the rotor shaft 17 of the motor 12 transmits the torque in the rotational direction R2, for example. At this time, the size of the space L1 is gradually reduced while the size of the space L2 is gradually increased. Then, a lateral surface 173b of the projection 173a of the inner spline 173 of the rotor shaft 17 in the motor 12 abuts against a lateral surface 183b of the projection 183a of the outer spline 183 of the drive shaft 18.

Figure 7:
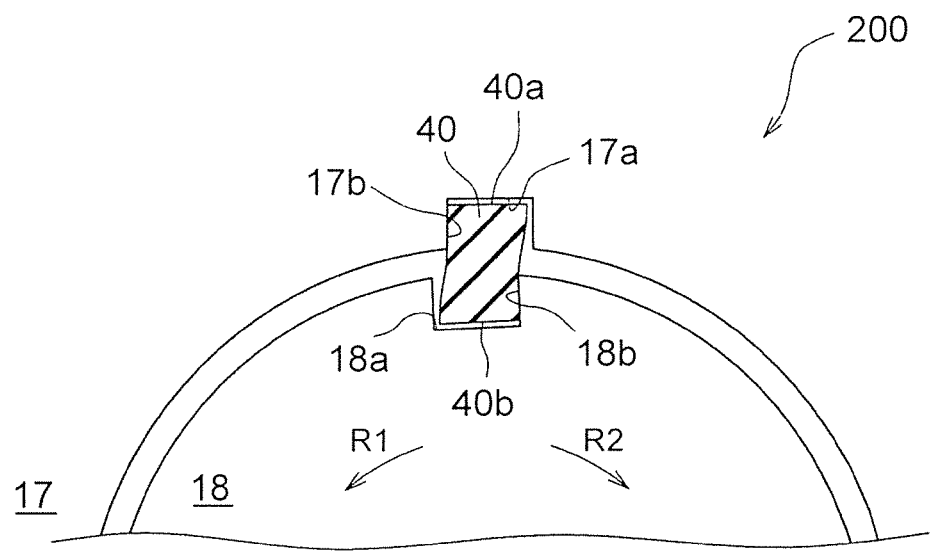
FIG. 7 is a view according to the embodiment for showing a state that the key section is bent and deformed when the inner spline of the rotor shaft of the motor and the outer spline of the drive shaft abut against each other.

At this time, as shown in FIG. 7, the key section 40 is bent and deformed in the rotational direction in conjunction with transmission of the torque by the rotor shaft 17 of the motor 12, and applies an elastic force in the rotational direction to the rotor shaft 17 of the motor 12 and the drive shaft 18. In other words, since the key section 40 is brought into contact with a wall 17b of the positioning member attachment section 17a and a wall 18b of the positioning member attachment section 18a, sliding in the rotational direction is suppressed.

Then, when the motor 12 finishes (stops) outputting torque and the rotor shaft 17 stops transmitting the torque, the rotor shaft 17 of the motor 12 transmits the torque in the rotational direction R1 and returns (is restored) to an original position (see FIG. 4) by the elastic force of the key section 40 that urges the key section 40 to return from a state of being bent and deformed in the rotational direction (see FIG. 7) to an original state (see FIG. 5). In other words, a position of the projection 173a of the inner spline 173 of the rotor shaft 17 in the motor 12 and a position of the projection 183a of the outer spline 183 of the drive shaft 18 with respect to each other are determined by the elastic force in the rotational direction of the key sections 40.

As described above, the projection 173a of the inner spline 173 of the rotor shaft 17 in the motor 12 and the projection 183a of the outer spline 183 of the drive shaft 18 are arranged in a manner to establish a specified relationship. More specifically, the projection 173a of the inner spline 173 of the rotor shaft 17 in the motor 12 and the projection 183a of the outer spline 183 of the drive shaft 18 are arranged such that the projection 173a and the projection 183a do not abut against each other either on the space L1 side or on the space L2 side when the torque output is stopped. Accordingly, when the engine outputs torque (fluctuates torque), the shock is absorbed by the key section 40, which is provided between the rotor shaft 17 of the motor 12 and the drive shaft 18, and thus noise (rattling noise) that is generated in the gear pair (the motor-side driven gear 26 and the motor-side drive gear 27) in conjunction with a fluctuation in torque can be suppressed (reduced), the gear pair being arranged upstream of the spline-fitting section I in a torque transmission path.

As described above, according to the spline positioning mechanism 200 of the first embodiment, effects, which will be listed below, can be obtained.

In the first embodiment, as described above, the key section 40 is arranged to determine the positions in the rotational direction of the inner spline 173 of the rotor shaft 17 in the motor 12 and the outer spline 183 of the drive shaft 18 to the specified positions, and applies the elastic force in the rotational direction to the rotor shaft 17 of the motor 12 and the drive shaft 18 such that the rotor shaft 17 and the drive shaft 18 are restored to the specified positions by the key section 40. Accordingly, when the motor 12 outputs torque, the key section 40 is bent and deformed in the rotational direction in conjunction with transmission of the torque by the rotor shaft 17 of the motor 12, and the inner spline 173 of the rotor shaft 17 in the motor 12 and the outer spline 183 of the drive shaft 18 abut against each other. Then, when the motor 12 finishes (stops) outputting torque, the key section 40 returns from the state of being bent and deformed to the original state by the elastic force in the rotational direction, and the inner spline 173 of the rotor shaft 17 in the motor 12 returns from a state of abutment against the outer spline 183 of the drive shaft 18 to the specified position that is separated from the outer spline 183. In other words, it is possible by the elastic force of the key section 40 to suppress the inner spline 173 of the rotor shaft 17 in the motor 12 and the outer spline 183 of the drive shaft 18 from being retained in abutment against each other. Accordingly, even when the output torque (fluctuation in torque) of the engine is transmitted to the spline-fitting section I via the motor-side driven gear 26 and the motor-side drive gear 27, a shock-absorbing effect can be obtained by the elastic force of the key section, which is arranged in the spline-fitting section I. As a result, it is possible to suppress the noise that is generated in the gear pair arranged upstream of the spline-fitting section I in the torque transmission path, that is, the motor-side driven gear 26 and the motor-side drive gear 27.

In the first embodiment, as described above, the outer end 40a and the inner end 40b along the radial direction of the key section 40 are respectively engaged with the positioning member attachment sections 17a, 18a. Accordingly, sliding of the key section 40 in the rotational direction, which occurs when the motor 12 or the engine outputs torque, is suppressed by the positioning member attachment sections 17a, 18a with which the key section 40 is engaged. Thus, it is possible to suppress degradation of the shock-absorbing effect that occurs when the inner spline 173 of the rotor shaft 17 in the motor 12 is stuck on one side (one side in the rotational direction) of the outer spline 183 of the drive shaft 18.

In the first embodiment, the key section 40 that applies the elastic force in the rotational direction to the rotor shaft 17 of the motor 12 and the drive shaft 18 is arranged such that the inner spline 173 of the rotor shaft 17 in the motor 12 and the outer spline 183 of the drive shaft 18 are restored to the positions where the size of the space L1 is substantially equal to the size of the space L2, the space L1 and the space L2 being formed between the inner spline 173 of the rotor shaft 17 in the motor 12 and the outer spline 183 of the drive shaft 18. Accordingly, the projection 183a of the outer spline 183 of the drive shaft 18 can be arranged (centered) (at the center) between the projection 173a and the other projection 173a of the inner spline 173 of the rotor shaft 17 in the motor 12. Thus, the size of the space L1 can substantially be equal to the size of the space L2. As a result, it is possible to obtain the shock-absorbing effect whose magnitude is substantially the same in the rotational direction R1 and in the rotational direction R2.

In the first embodiment, as described above, the key section 40, which is formed of the elastic member and applies the elastic force in the rotational direction to the rotor shaft 17 of the motor 12 and the drive shaft 18, is provided such that the inner spline 173 of the rotor shaft 17 in the motor 12 and the outer spline 183 of the drive shaft 18 are restored to the specified positions in the rotational direction. Accordingly, the key section 40, which is formed of the elastic member, can easily apply the elastic force to the rotor shaft 17 of the motor 12 and the drive shaft 18 that make relative rotation with each other. Thus, the shock-absorbing effect can be improved.

Next, a description will be made on a modification of the first embodiment described above. Differing from the above first embodiment that shows the example in which the key section 40 is arranged such that the specified space is provided between the key section 40 and each of the positioning member attachment sections 17a, 18a, a description will be made for the modification of the first embodiment on an example in which the key section is attached to both of the positioning member attachment section formed in the rotor shaft of the motor and the positioning member attachment section formed in the drive shaft by press-fitting.

In the modification of the first embodiment, the outer end (a portion on the opposite side of the axis) of the key section is press-fitted to the positioning member attachment section (groove) of the rotor shaft in the motor, and the inner end (a portion on the axis side) of the key section is press-fitted to the positioning member attachment section (groove) of the drive shaft.

Accordingly, the key section cannot easily move in a thrust direction (the axial direction) within the positioning member attachment sections. With such a structure, the key section can perform its role as a spring with respect to both of the rotational direction R1 (R2) and the thrust direction (axial direction). Here, the number of the key section is not particularly limited. The other configurations are the same as those in the first embodiment described above.

Next, with reference to FIG. 4, FIG. 6, and FIG. 8 to FIG. 12, a description will be made on a spline positioning mechanism 201 according to a second embodiment. Differing from the above first embodiment that shows the example in which the two key sections in the square pole shapes are arranged between the rotor shaft of the motor and the drive shaft, a description will be made for the second embodiment on an example in which a key with a ring that has a shock-absorbing section and a circular-shaped ring section between the rotor shaft of the motor and the drive shaft.

Figure 8:
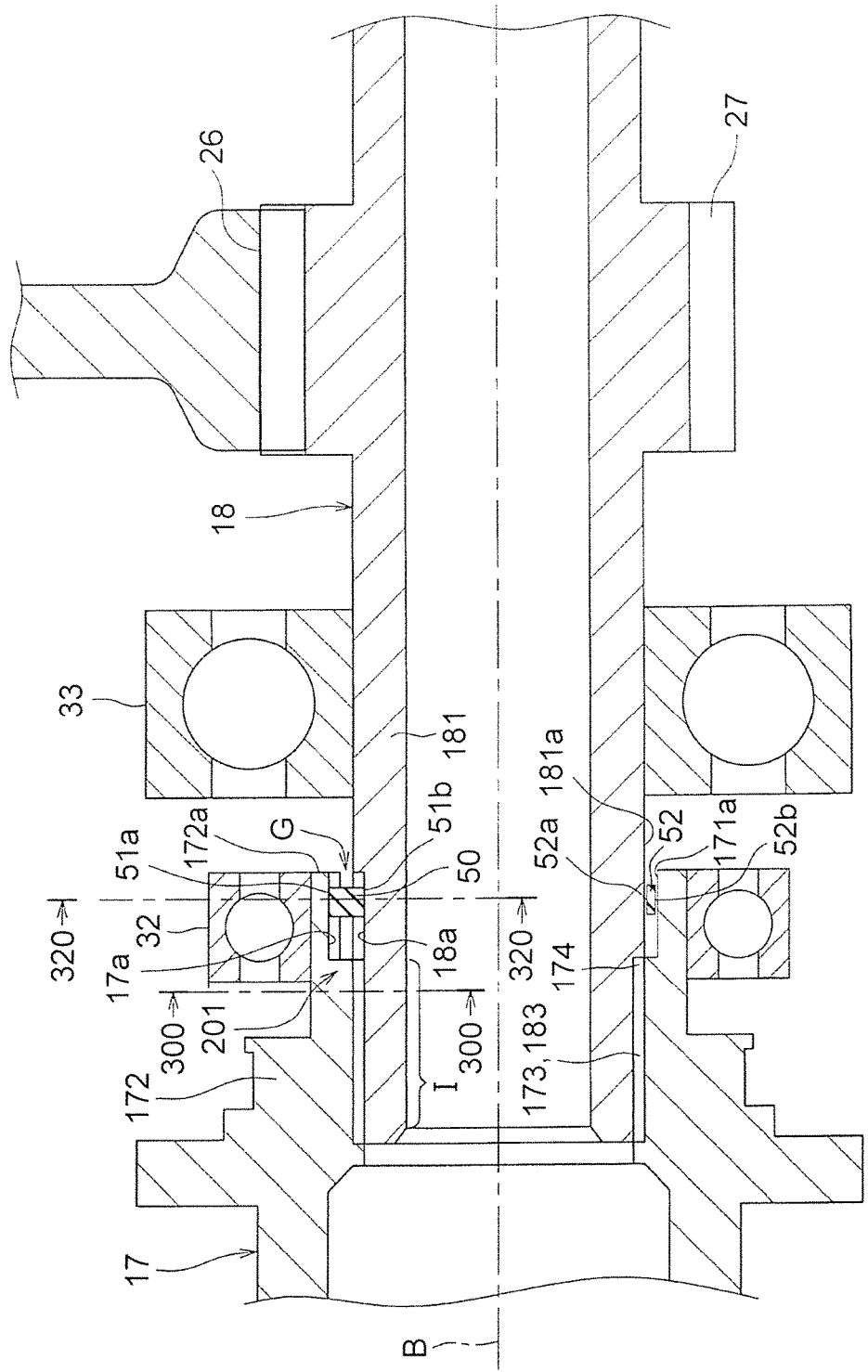
FIG. 8 is a cross-sectional view according to a second embodiment of the present invention that is taken along a plane including the rotor shaft of the motor and the drive shaft.
Figure 9:
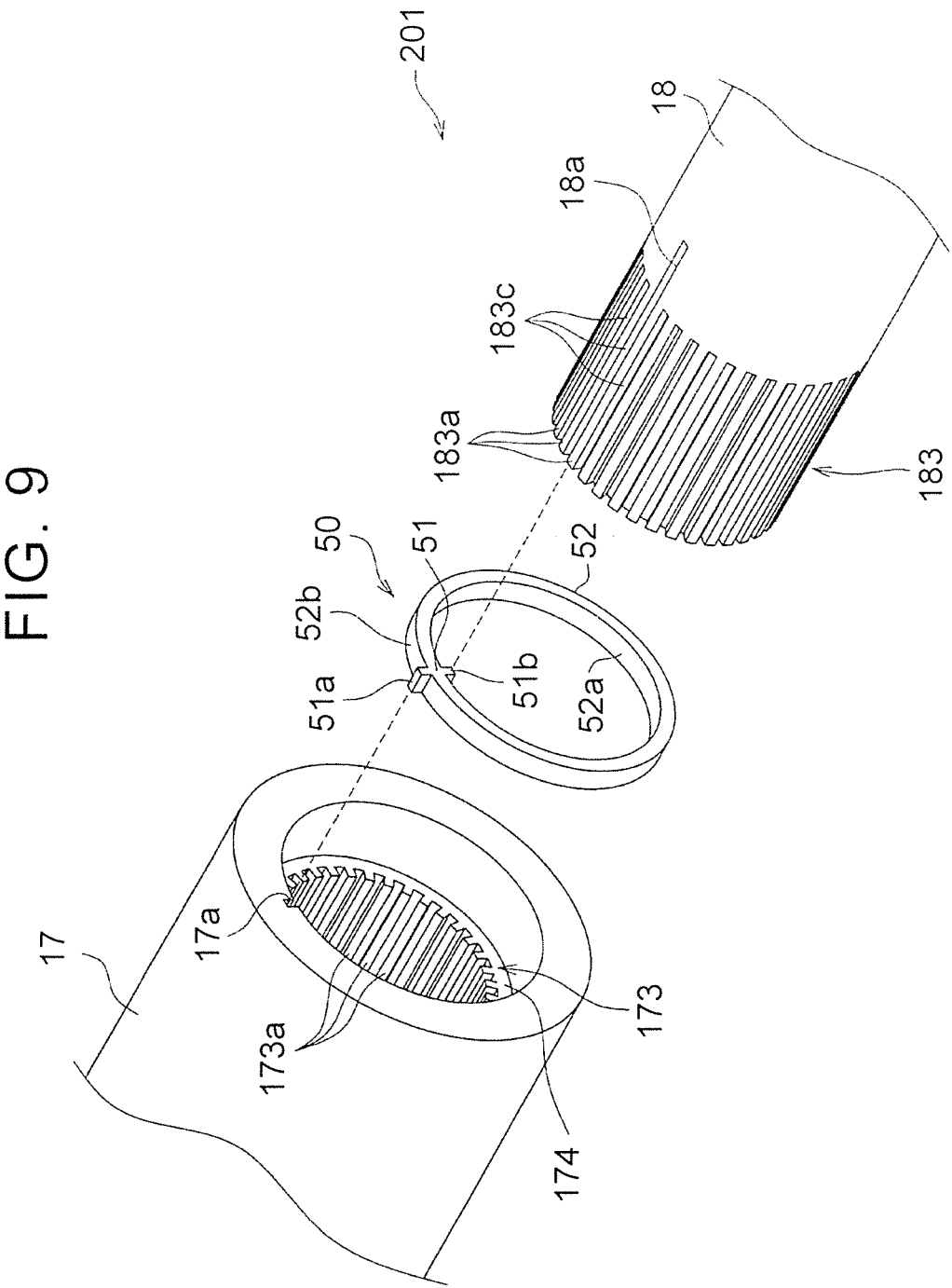
FIG. 9 is a perspective view (schematic view) for showing the rotor shaft of the motor, a key with a ring, and the drive shaft according to the embodiment.
Figure 10:
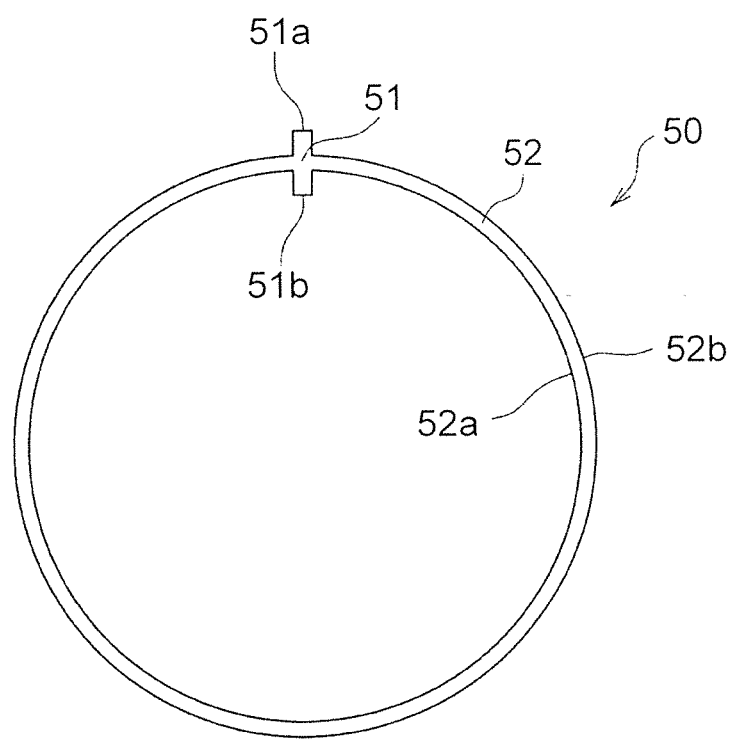
FIG. 10 is a front view of the key with a ring according to the embodiment.

In the spline positioning mechanism 201 according to the second embodiment, as shown in FIG. 8, a key with a ring (positioning member) 50 is arranged between the rotor shaft 17 of the motor 12 and the drive shaft 18. As shown in FIG. 9 and FIG. 10, the key with a ring 50 has a key section (the shock-absorbing section) 51 that is formed of an elastic member and a ring section 52. The key section 51 has a rectangular shape that extends along the radial direction. The ring section 52 holds the key section 51 between portions thereof. The ring section 52 has the shock-absorbing effect with respect to the thrust direction (axial direction).

Figure 11:
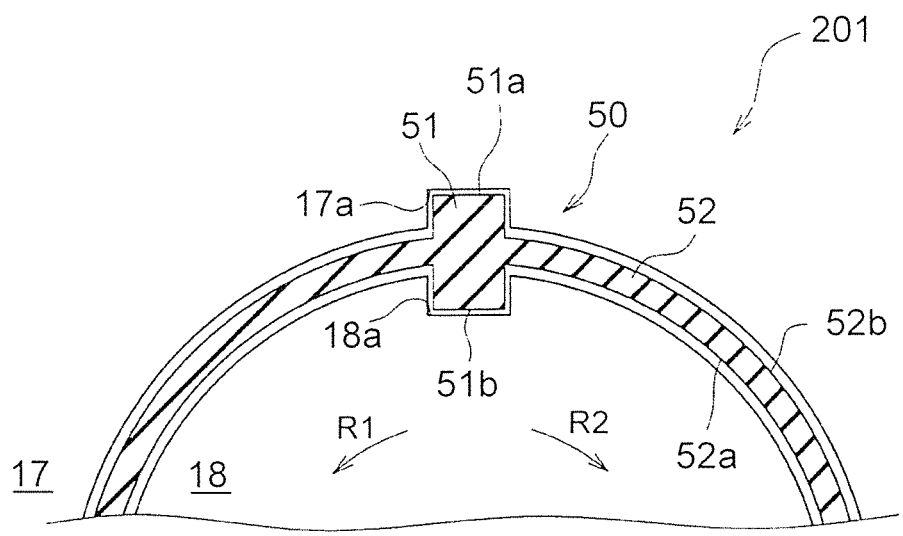
FIG. 11 is a cross-sectional view that is taken along the line 320-320 in FIG. 8.

As shown in FIG. 11, a specified space is provided between an outer end 51a of the key section 51 of the key with a ring 50 and the positioning member attachment section 17a of the other end 172 (see FIG. 8) of the rotor shaft 17. Meanwhile, a specified space is provided between an inner end 51b of the key section 51 of the key with a ring 50 and the positioning member attachment section 18a of the one end 181 of the drive shaft 18.

As shown in FIG. 8, an inner periphery 52a of the ring section 52 of the key with a ring 50 is arranged to separate from the outer peripheral surface 181a of the one end 181 of the drive shaft 18. Similarly, an outer periphery 52b of the ring section 52 of the key with a ring 50 is arranged to separate from an inner peripheral surface 171a of the one end 171 of the rotor shaft 17 in the motor 12. In this embodiment, an example is shown in which the ring section 52 of the key with a ring 50 is arranged to separate from the inner peripheral surface 171a of the rotor shaft 17 and the outer peripheral surface 181a of the drive shaft 18. However, the ring section 52 of the key with a ring 50 may be arranged to abut against one or both of the rotor shaft 17 and the drive shaft 18. The other configurations in the second embodiment are the same as those in the first embodiment described above.

Next, with reference to FIG. 4, FIG. 6, FIG. 11, and FIG. 12, a description will be made on an operation of the key with a ring 50 when the motor 12 outputs torque and the rotor shaft 17 transmits the torque.

As shown in FIG. 4, in the state before the motor 12 outputs torque, the space L1 is substantially equal to the space L2, the space L1 and the space L2 being formed between the projection 173a (tooth) of the inner spline 173 of the rotor shaft 17 in the motor 12 and the projection 183a (tooth) of the outer spline 183 of the drive shaft 18. At this time, as shown in FIG. 11, the key section 51 of the key with a ring 50 is neither bent nor deformed.

Next, as shown in FIG. 6, when the motor 12 outputs torque, the rotor shaft 17 of the motor 12 transmits the torque in the rotational direction R2, for example. At this time, the size of the space L1 is gradually reduced while the size of the space L2 is gradually increased. Then, the lateral surface 173b of the projection 173a of the inner spline 173 of the rotor shaft 17 in the motor 12 abuts against the lateral surface 183b of the projection 183a of the outer spline 183 of the drive shaft 18.

Figure 12:
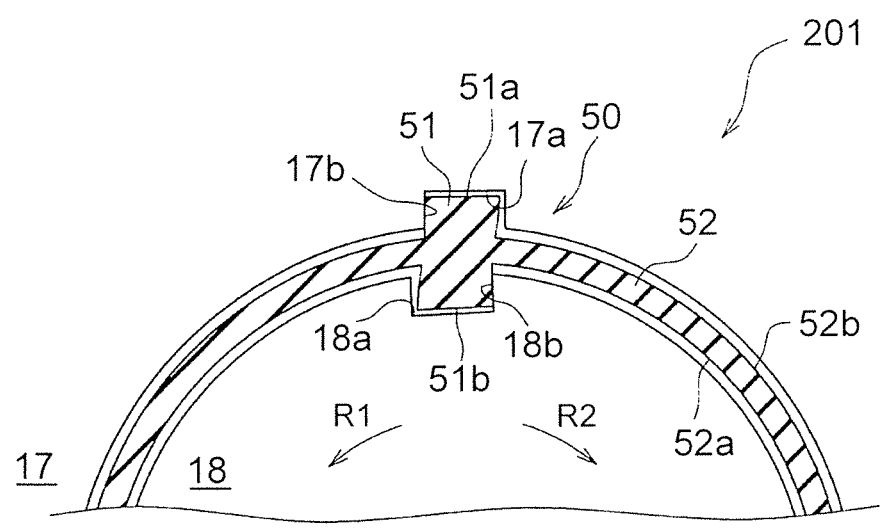
FIG. 12 is a view according to the embodiment for showing a state that a key section of the key with a ring is bent and deformed when the inner spline of the rotor shaft of the motor and the outer spline of the drive shaft abut against each other.

At this time, as shown in FIG. 12, the key section 51 of the key with a ring 50 is bent and deformed in the rotational direction in conjunction with transmission of the torque by the rotor shaft 17 of the motor 12, and applies the elastic force in the rotational direction to the rotor shaft 17 of the motor 12 and the drive shaft 18. In other words, since the key section 51 is brought into contact with the wall 17b of the positioning member attachment section 17a and the wall 18b of the positioning member attachment section 18a, the sliding in the rotational direction is suppressed.

Then, when the motor 12 finishes (stops) outputting torque and the rotor shaft 17 stops transmitting the torque, the rotor shaft 17 of the motor 12 transmits the torque in the rotational direction R1 and returns to the original position (see FIG. 4) by the elastic force of the key section 51 that urges the key section 51 to return from a state of being bent and deformed in the rotational direction (see FIG. 12) to an original state (see FIG. 11). In other words, the position of the projection 173a of the inner spline 173 of the rotor shaft 17 in the motor 12 and the position of the projection 183a of the outer spline 183 of the drive shaft 18 with respect to each other are determined by the elastic force in the rotational direction of the key section 51 of the key with a ring 50.

In addition, as described above, the projection 173a of the inner spline 173 of the rotor shaft 17 in the motor 12 and the projection 183a of the outer spline 183 of the drive shaft 18 are arranged in a manner to establish the specified relationship. More specifically, the projection 173a of the inner spline 173 of the rotor shaft 17 in the motor 12 and the projection 183a of the outer spline 183 of the drive shaft 18 are arranged such that the projection 173a and the projection 183a do not abut against each other either on the space L1 side or on the space L2 side when the torque output is stopped. Accordingly, when the engine outputs torque (fluctuates torque), the shock is absorbed by the key section 51 of the key with a ring 50, which is provided between the rotor shaft 17 of the motor 12 and the drive shaft 18, and thus the noise that is generated in the gear pair (the motor-side driven gear 26 and the motor-side drive gear 27) in conjunction with the fluctuation in torque can be suppressed (reduced), the gear pair being arranged upstream of the spline-fitting section I in the torque transmission path.

As described above, according to the spline positioning mechanism 201 of the second embodiment, effects, which will be listed below, can be obtained.

In the second embodiment, as described above, the rotor shaft 17 of the motor 12 is formed with the positioning member attachment section 17a with which the outer end 51a of the key section 51 is engaged, and the drive shaft 18 is formed with the positioning member attachment section 18a with which the inner end 51b of the key section 51 is engaged. Accordingly, the sliding in the rotational direction of the key section 51 of the key with a ring 50, which occurs when the motor 12 outputs torque, can be suppressed by both of the wall 17b of the positioning member attachment section 17a and the wall 18b of the positioning member attachment section 18a. Thus, it is possible to effectively suppress degradation of the shock-absorbing effect that occurs when the inner spline 173 of the rotor shaft 17 in the motor 12 is stuck on one side (one side in the rotational direction) of the outer spline 183 of the drive shaft 18. The other effects of the second embodiment are the same as those of the first embodiment described above.

Next, a description will be made on a modification of the second embodiment described above. Differing from the above second embodiment in which the key section 51 and the ring section 52 are integrally formed as the positioning member (key with a ring), a description will be made for the modification of the second embodiment on an example in which the key section and the ring section are formed of separate bodies.

In the modification of the second embodiment, the key section and the ring section that are formed of the separate bodies are provided between the rotor shaft of the motor and the drive shaft. Similar to the first embodiment described above, the key section is arranged between the rotor shaft of the motor and the drive shaft, and performs its role as the spring with respect to the rotational direction R1 (R2). Here, the key section may be attached to each of the positioning member attachment sections by press-fitting or may be attached such that a space is provided between the key section and each of the positioning member attachment sections.

The ring section is provided in a portion that is located between the rotor shaft of the motor and the drive shaft and that is on the drive shaft side of a portion in which the key section is arranged. The key section and the ring section are arranged to be aligned in the axial direction. In addition, the ring section is formed of rubber or the like, and performs its role as the spring with respect to the thrust direction (axial direction).

Furthermore, the inner peripheral surface of the rotor shaft of the motor is formed with the positioning member attachment section (groove) to which an outer peripheral surface of the ring section is attached. Moreover, the outer peripheral surface of the drive shaft is formed with the positioning member attachment section (groove) to which an inner peripheral surface of the ring section is attached. Each of these positioning member attachment sections (grooves) is formed for the entire periphery of the respective axis. Here, the ring section may be attached to each of the positioning member attachment sections by press-fitting, or may be attached such that a space is provided between the ring section and each of the positioning member attachment sections. The other configurations are the same as those in the second embodiment described above.

Next, with reference to FIG. 4, FIG. 6, and FIG. 13 to FIG. 17, a description will be made on a spline positioning mechanism 202 according to a third embodiment. Differing from the above second embodiment that shows the example in which the key with a ring is arranged with the space being provided between the rotor shaft of the motor and the drive shaft, a description will be made for the third embodiment on an example in which the key with a ring is arranged by being press-fitted to the drive shaft.

Figure 13:
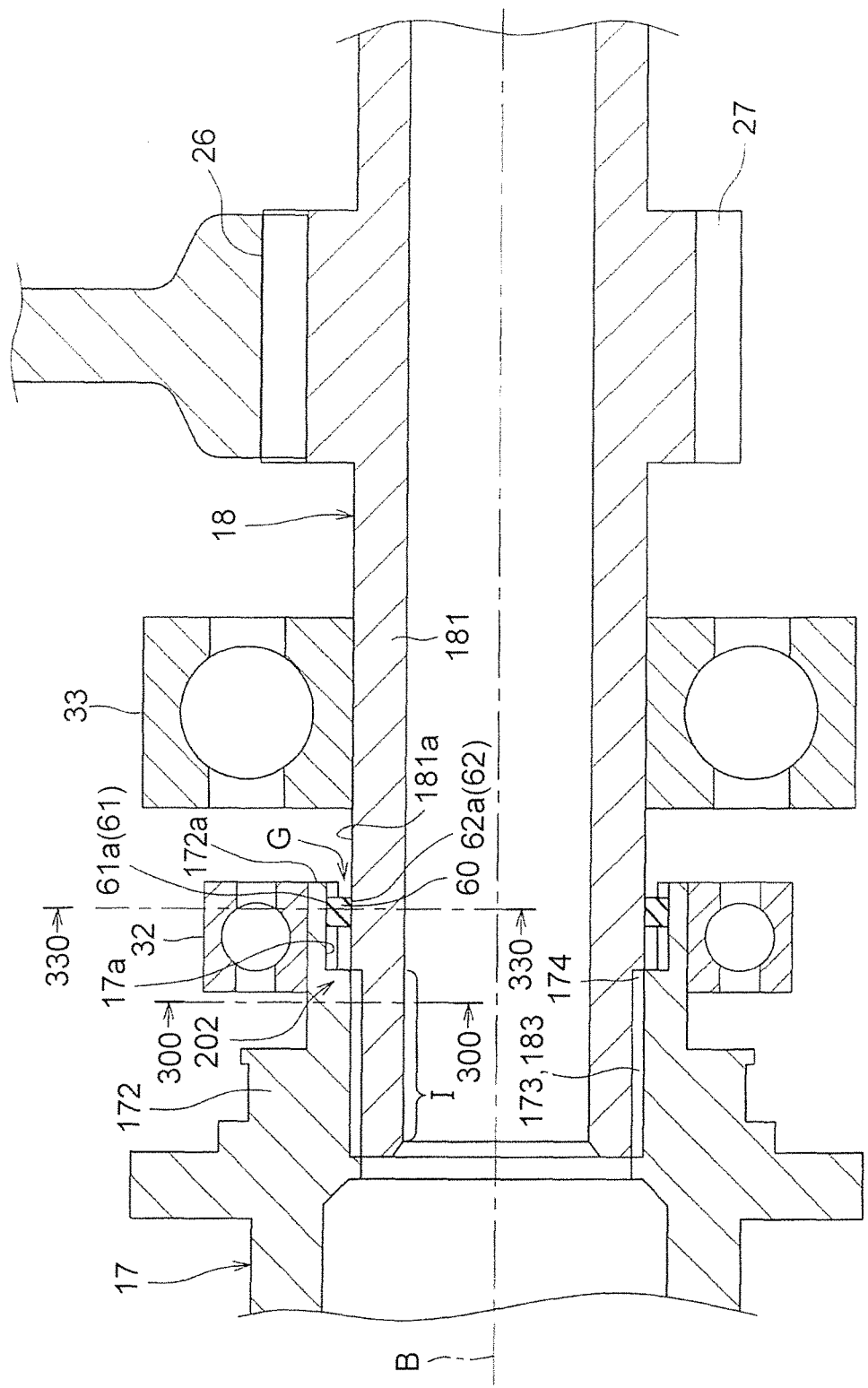
FIG. 13 is a cross-sectional view according to a third embodiment of the present invention that is taken along a plane including the rotor shaft of the motor and the drive shaft.
Figure 14:
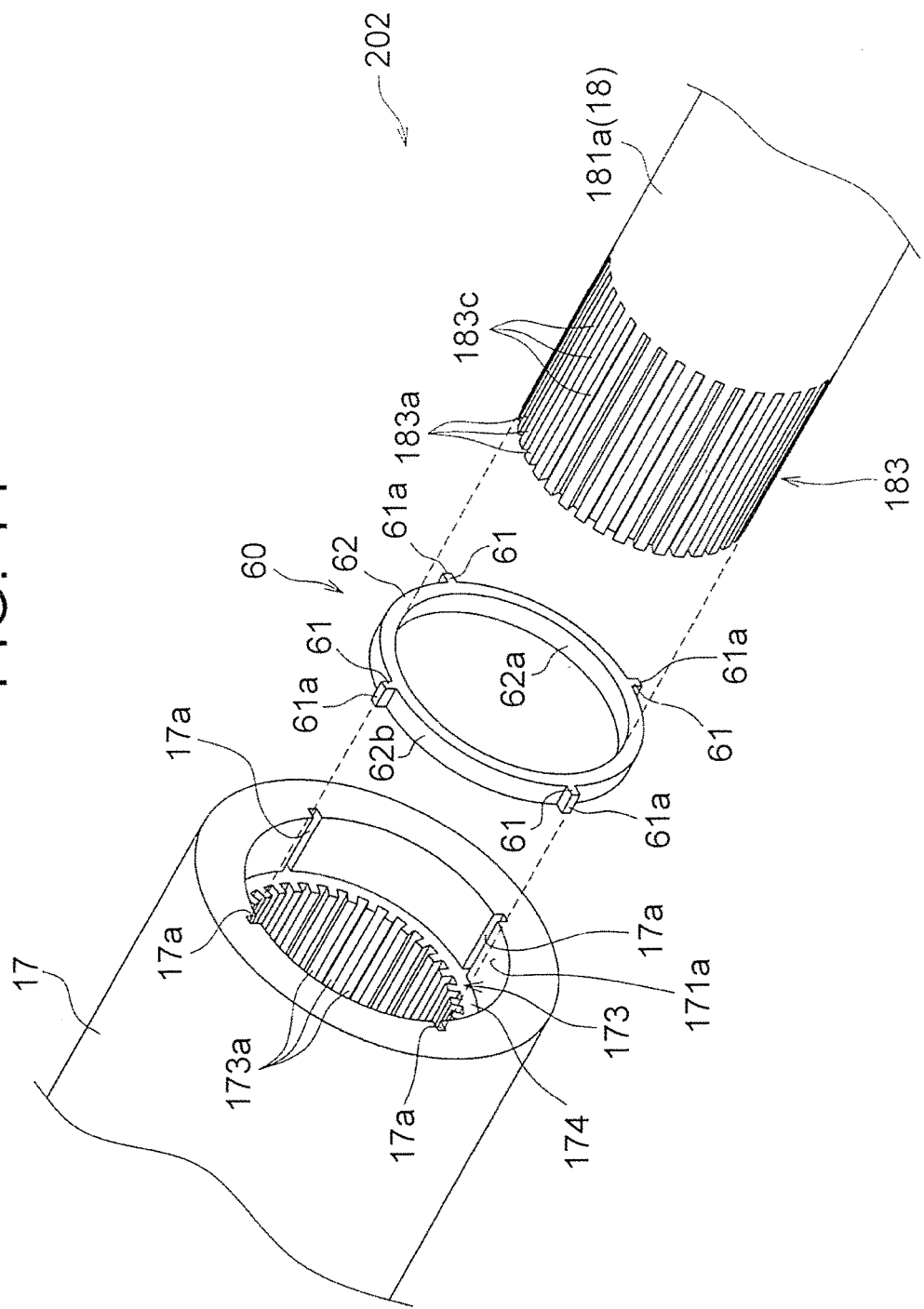
FIG. 14 is a perspective view for showing the rotor shaft of the motor, a key with a ring, and the drive shaft according to the embodiment.
Figure 15:
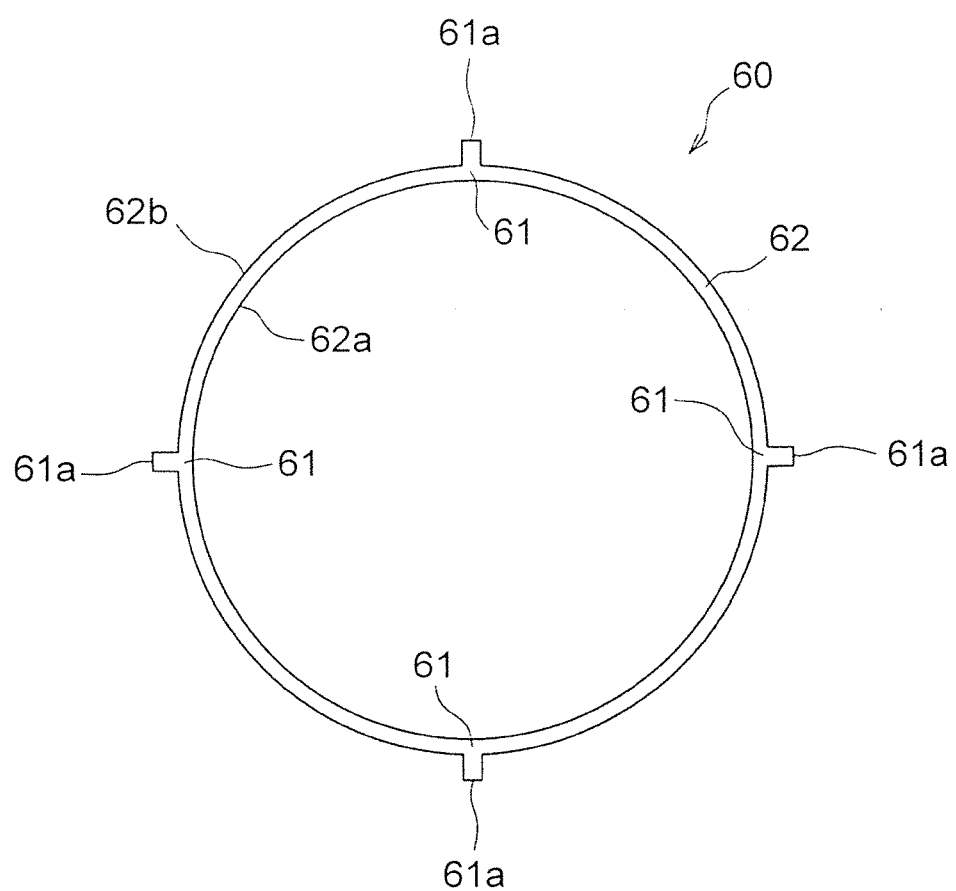
FIG. 15 is a front view of the key with a ring according to the embodiment.

As shown in FIG. 13, in the spline positioning mechanism 202 according to the third embodiment, a key with a ring (positioning member) 60 is arranged between the rotor shaft 17 of the motor 12 and the drive shaft 18. As shown in FIG. 14 and FIG. 15, the key with a ring 60 has four key sections (shock-absorbing sections) 61, each of which is formed of an elastic member, and a ring section 62. The four key sections 61 are formed at equal angular intervals, and each have a rectangular shape that extends outward from the ring section 62. The ring section 62 has a circular shape so as to connect the four key sections 61. The ring section 62 has the shock-absorbing effect with respect to the thrust direction (axial direction).

Figure 16:
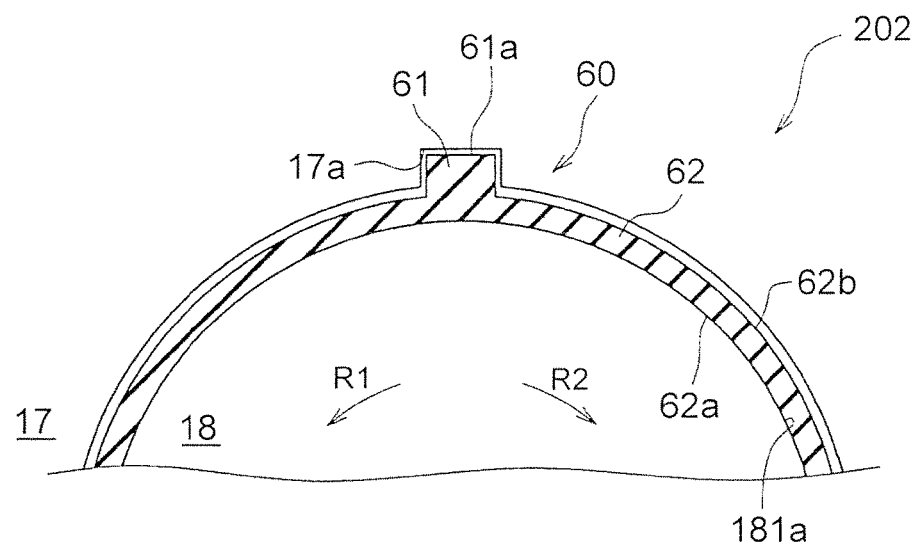
FIG. 16 is a cross-sectional view that is taken along the line 330-330 in FIG. 13.

As shown in FIG. 16, a specified space is provided between an outer end 61a of the key section 61 of the key with a ring 60 and the positioning member attachment section 17a of the other end 172 of the rotor shaft 17. Meanwhile, an inner peripheral surface 62a of the ring section 62 of the key with a ring 60 is arranged in a state of abutment against the outer peripheral surface 181a of the one end 181 of the drive shaft 18. In other words, the inner peripheral surface 62a of the ring section 62 of the key with a ring 60 is attached to the outer peripheral surface 181a of the one end 181 of the drive shaft 18 by press-fitting.

In addition, as shown in FIG. 15, an outer peripheral surface 62b of the ring section 62 of the key with a ring 60 is arranged to separate from the inner peripheral surface 171a of the rotor shaft 17 of the motor 12. In this embodiment, the example is shown in which the outer peripheral surface 62b of the ring section 62 of the key with a ring 60 is arranged to separate from the inner peripheral surface of the rotor shaft 17. However, the outer peripheral surface 62b of the ring section 62 of the key with a ring 60 may be arranged to abut against the inner peripheral surface 171a of the rotor shaft 17. The other configurations in the third embodiment are the same as those in the first and second embodiments.

Next, with reference to FIG. 4, FIG. 6, FIG. 16, and FIG. 17, a description will be made on an operation of the key with a ring 60 when the motor 12 outputs torque and the rotor shaft 17 transmits the torque.

As shown in FIG. 4, in the state before the motor 12 outputs torque, the space L1 is substantially equal to the space L2, the space L1 and the space L2 being formed between the projection 173a (tooth) of the inner spline 173 of the rotor shaft 17 in the motor 12 and the projection 183a (tooth) of the outer spline 183 of the drive shaft 18. At this time, as shown in FIG. 16, the key section 61 of the key with a ring 60 is neither bent nor deformed.

Next, as shown in FIG. 6, when the motor 12 outputs torque, the rotor shaft 17 of the motor 12 transmits the torque in the rotational direction R2, for example. This causes the size of the space L1 to be gradually reduced and the size of the space L2 to be gradually increased. Then, the lateral surface 173b of the projection 173a of the inner spline 173 of the rotor shaft 17 in the motor 12 abuts against the lateral surface 183b of the projection 183a of the outer spline 183 of the drive shaft 18.

Figure 17:
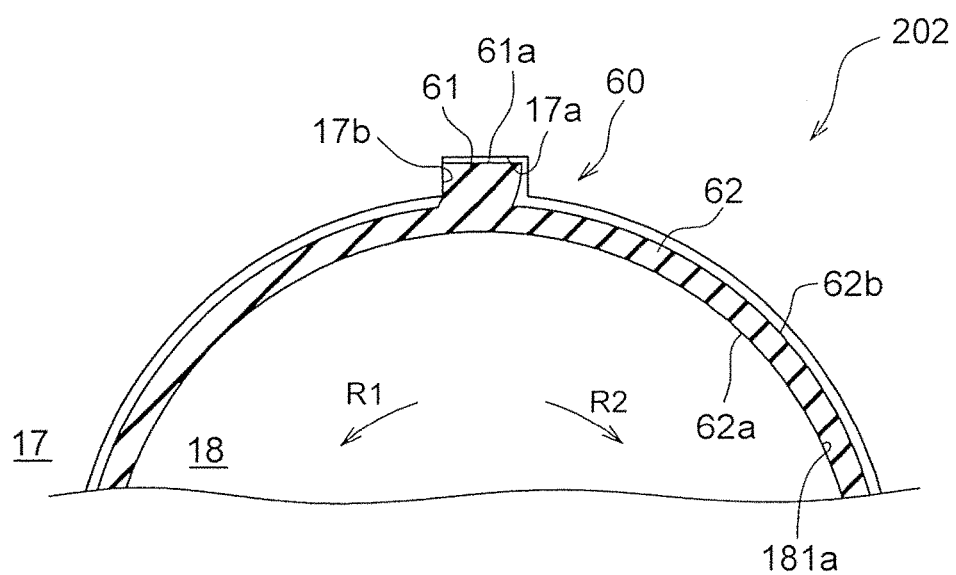
FIG. 17 is a view according to the embodiment for showing a state that a key section of the key with a ring is bent and deformed when the inner spline of the rotor shaft of the motor and the outer spline of the drive shaft abut against each other.

At this time, as shown in FIG. 17, the key section 61 of the key with a ring 60 is bent and deformed in the rotational direction in conjunction with transmission of the torque by the rotor shaft 17 of the motor 12, and applies the elastic force in the rotational direction to the rotor shaft 17 of the motor 12 and the drive shaft 18. The specified space is provided between the outer end 61a of the key section 61 of the key with a ring 60 and the positioning member attachment section 17a. Since the inner peripheral surface 62a of the ring section 62 of the key with a ring 60 is attached to the outer peripheral surface 181a of the drive shaft 18 by press-fitting, the key section 61 of the key with a ring 60 does not slide in the rotational direction when the rotor shaft 17 transmits the torque.

Then, when the motor 12 finishes (stops) outputting torque and the rotor shaft 17 stops transmitting the torque, the rotor shaft 17 of the motor 12 transmits the torque in the rotational direction R1 and returns to the original position (see FIG. 4) by the elastic force of the key section 61 that urges the key section 61 to return from a state of being bent and deformed in the rotational direction to an original state (see FIG. 16). In other words, the position of the projection 173a of the inner spline 173 of the rotor shaft 17 in the motor 12 and the position of the projection 183a of the outer spline 183 of the drive shaft 18 with respect to each other are determined by the key section 61 of the key with a ring 60.

As described above, the projection 173a of the inner spline 173 of the rotor shaft 17 in the motor 12 and the projection 183a of the outer spline 183 of the drive shaft 18 are arranged in a manner to establish the specified relationship. More specifically, the projection 173a of the inner spline 173 of the rotor shaft 17 in the motor 12 and the projection 183a of the outer spline 183 of the drive shaft 18 are arranged such that the projection 173a and the projection 183a do not abut against each other either on the space L1 side or on the space L2 side when the torque output is stopped. Accordingly, when the engine outputs torque (fluctuates torque), the shock is absorbed by the key section 61 of the key with a ring 60, which is provided between the rotor shaft 17 of the motor 12 and the drive shaft 18, and thus the noise that is generated in the gear pair (the motor-side driven gear 26 and the motor-side drive gear 27) in conjunction with the fluctuation in torque can be suppressed (reduced), the gear pair being arranged upstream of the spline-fitting section I in the torque transmission path.

As described above, according to the spline positioning mechanism 202 of the third embodiment, effects, which will be listed below, can be obtained.

In the third embodiment, as described above, the rotor shaft 17 of the motor 12 is formed with the positioning member attachment section 17a with which the key section 61 of the key with a ring 60 is engaged, and the ring section 62 is press-fitted to the drive shaft 18. Accordingly, the drive shaft 18 and the key with a ring 60 can rotate together, and the sliding in the rotational direction of the key with a ring 60 can be suppressed by the positioning member attachment section 17a. The other effects of the third embodiment are the same as those of the first and second embodiments described above.

Next, with reference to FIG. 1, FIG. 2, FIG. 18, and FIG. 19, a description will be made on a fourth embodiment. Differing from the above first embodiment that shows the example in which the space L1 between the projection of the inner spline of the rotor shaft and the projection of the outer spline of the drive shaft is arranged to be substantially equal to the space L2, a description will be made for a spline positioning mechanism 203 according to the fourth embodiment on an example in which the size of a first space L11 between the projection of the inner spline of the rotor shaft and the projection of the outer spline of the drive shaft is larger than the size of a second space L12.

Figure 18:
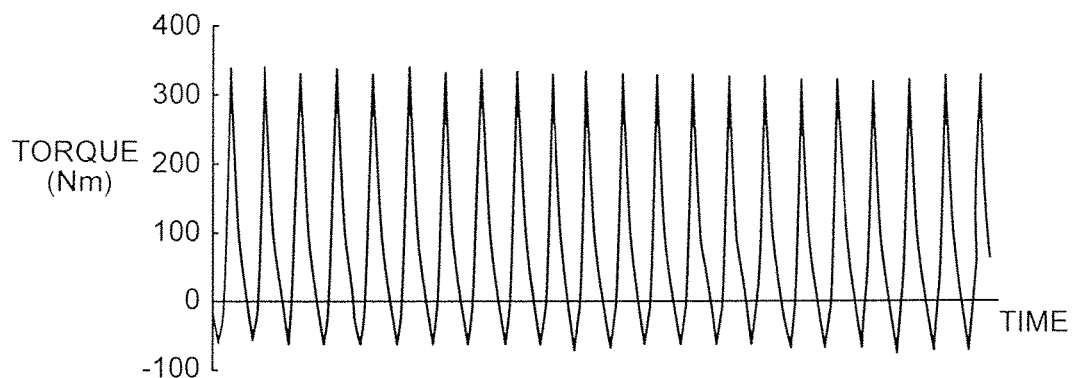
FIG. 18 is a graph according to a fourth embodiment of the present invention for showing an example in which a magnitude of torque in a forward rotational direction and a magnitude of torque in a reverse rotational direction, which are output by an engine, are asymmetrical on a positive value side and a negative value side.

In FIG. 18, a vertical axis indicates a magnitude of output torque (Nm) of the engine, and a horizontal axis indicates a lapse of time. In the fourth embodiment, as shown in FIG. 18, the engine outputs approximately 340 (Nm) of torque in a forward rotational direction (the first rotational direction, an upper side in the graph) and outputs approximately 50 (Nm) of torque in a reverse rotational direction (the second rotational direction, a lower side in the graph). In other words, a magnitude of the torque in the forward rotational direction and a magnitude of the torque in the reverse rotational direction, which are output by the engine, are asymmetrical on a positive value side and a negative value side, and thus the fluctuation in torque is generated. Accordingly, the fluctuation in torque that is also generated in each of the motor-side driven gear 26 and the motor-side drive gear 27 (see FIG. 1 and FIG. 2), to which the torque output from the engine is transmitted, are also asymmetrical on the positive value side and the negative value side. The above fluctuations in torque are obtained in advance by an experiment, a simulation, or the like.

Here, the forward rotational direction (first rotational direction) refers to a rotational direction in which the engine drives the drive wheels in the forward traveling direction, for example. The reverse rotational direction (second rotational direction) refers to a rotational direction in which the engine drives the drive wheels in the reverse traveling direction, for example. Depending on the specification of the apparatus, relationships just as described may be reversed.

Figure 19:
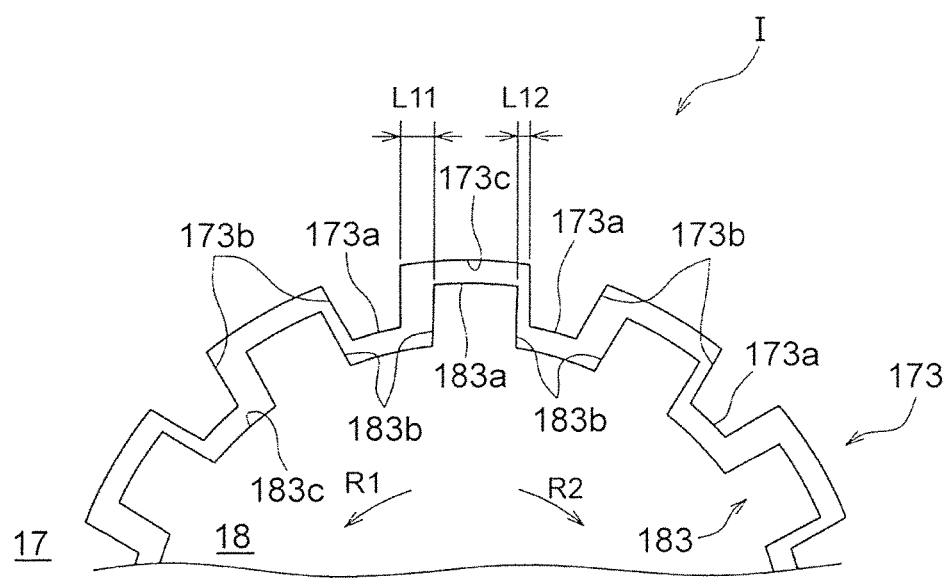
FIG. 19 is a view according to the embodiment for showing an example in which the size of a first space L11 between the rotor shaft of the motor and the drive shaft is larger than the size of a second space L12.

As shown in FIG. 19, in a state that the rotor shaft 17 of the motor 12 or the drive shaft 18 does not relatively transmit torque (a state that the key section 40 is neither bent nor deformed), the space L11 (a space in a direction along the rotational direction R1 (on a forward rotation side)) between the projection 173a (tooth) of the inner spline 173 of the rotor shaft 17 and the projection 183a (tooth) of the outer spline 183 of the drive shaft 18 is set to be larger than the space L12 (a space in a direction along the rotational direction R2 (on a reverse rotation side)). In other words, the size of the space L11 and the size of the space L12 are set in accordance with the magnitude of torque on the forward rotation side and the magnitude of torque on the reverse rotation side (the fluctuations in torque), which are output by the engine.

When the engine outputs relatively large torque in the forward rotational direction, the drive shaft 18 transmits the torque at a relatively large angle in the forward rotational direction (rotational direction R1). However, since the space L11 is set larger than the space L12, the shock-absorbing effect can effectively be obtained by the key section 40. On the other hand, when the engine outputs relatively small torque in the reverse rotational direction, the drive shaft 18 transmits the torque at a relatively small angle in the reverse rotational direction (rotational direction R2). At this time, since the space L12 is set smaller than the space L11, the shock-absorbing effect can effectively be obtained by the key section 40 without unnecessarily increasing the size of the space.

The other configurations in the fourth embodiment are the same as those in the first embodiment.

As described above, according to the spline positioning mechanism 203 of the fourth embodiment, effects, which will be listed below, can be obtained.

In the fourth embodiment, as described above, in a case where the fluctuation in the output torque by which the engine drives the drive wheels in the rotational direction R1 is larger than the fluctuation in the output torque by which the engine drives the drive wheels in the rotational direction R2, the key section 40, which applies the elastic force in the rotational direction to the projection 173a of the inner spline 173 of the rotor shaft 17 in the motor 12 and the projection 183a of the outer spline 183 of the drive shaft 18, is arranged such that the projection 173a and the projection 183a are restored to the position at which the size of the space L11 between the projection 173a of the inner spline 173 of the rotor shaft 17 in the motor 12 and the projection 183a of the outer spline 183 of the drive shaft 18 becomes larger than the size of the space L12 between the projection 173a of the inner spline 173 of the rotor shaft 17 in the motor 12 and the projection 183a of the outer spline 183 of the drive shaft 18, the projection 173a and the projection 183a abutting against each other in the space L11 when the engine drives the drive wheels in the rotational direction R1, and the projection 173a and the projection 183a abutting against each other in the space L12 when the engine drives the drive wheels in the rotational direction R2. Accordingly, when the magnitude of the fluctuation in torque in the rotational direction R1 and the magnitude the fluctuation in torque in the rotational direction R2, which are output by the engine, are asymmetrical on the positive value side and the negative value side, the relatively large space (space L11) is provided on the rotational direction R1 side on which the fluctuation of torque is large. Thus, there is no need to provide the unnecessarily large space (space L12) on the rotational direction R2 side.

The embodiments of the disclosure should be considered in all respects as illustrative and not restrictive. The scope of the present invention is defined by the scope of the claims rather than the descriptions of the above embodiments, and includes all modifications which come within the meaning and scope of equivalents of the claims.

For example, the first to fourth embodiments described above show the example in which positioning is performed by using the key section that is formed to extend in the radial direction of the rotor shaft. However, the present invention is not limited to this example. In addition to the elastic key, the present invention can also be applied to a structure in which a coil spring, a plate spring, a spiral-like spring, or the like is combined with a solid key as long as the structure can position the rotor shaft of the motor and the drive shaft in the rotational direction and can apply the elastic force to the rotor shaft of the motor and the drive shaft. In addition, any of rubber, resin, and metal can be adopted for a material.

The first embodiment described above shows the example in which the two key sections are provided. However, the present invention is not limited to this example. For example, one, three, or more of the key sections can also be provided.

The second embodiment described above shows the example in which the one key section is provided in the ring section of the key with a ring. However, the present invention is not limited to this example. For example, two or more of the key sections may be provided in the ring section of the key with a ring.

The third embodiment described above shows the example in which the key section that extends outward in the radial direction (the rotor shaft side of the motor) is provided in the ring section of the key with a ring. However, the present invention is not limited to this example. For example, the key section may be provided in the ring section of the key with a ring such that the key section extends inward in the radial direction (the drive shaft side). In this case, the outer peripheral surface of the ring section of the key with a ring may be press-fitted to the inner peripheral surface of the rotor shaft of the motor.

The third embodiment described above shows the example in which the four key sections that extend outward in the radial direction (the rotor shaft side of the motor) are provided in the ring section of the key with a ring. However, the present invention is not limited to this example. For example, one to three, five, or more of the key sections may be provided in the ring section of the key with a ring.

The fourth embodiment described above shows the example in which the key section is arranged such that the space L11 becomes larger than the space L12. However, the present invention is not limited to this example. For example, the key section can be arranged such that the space L11 becomes smaller than the space L12.

The following effects can be obtained by the configuration of each of the embodiments described above. According to the above configuration, when the electric motor outputs torque, the positioning member is bent and deformed in the rotational direction in conjunction with the transmission of the torque by the rotary shaft of the electric motor. In addition, the spline of the rotary shaft of the electric motor abuts against the spline of the second rotary shaft (drive shaft). Then, when the electric motor finishes (stops) outputting torque, the positioning member returns (is restored) from the state of being bent and deformed by the elastic force in the rotational direction to the original state. Accordingly, the spline of the rotary shaft of the electric motor returns from the state of abutment against the spline of the second rotary shaft to the specified separated position. In other words, the elastic force of the positioning member can suppress abutment of the spline of the rotary shaft of the electric motor against the spline of the second rotary shaft from being retained. Thus, even when output torque (the fluctuation in torque) of the drive source is transmitted to the spline-fitting section via the gear pair, which includes the third rotary shaft and the second rotary shaft, the shock-absorbing effect can be obtained by the elastic force of the positioning member arranged in the spline-fitting section. As a result, it is possible to suppress the noise of the gear pair, which is provided between the third rotary shaft and the second rotary shaft, that is, the gear pair arranged upstream of the spline-fitting section in the torque transmission path. The positioning member in the power transmission apparatus for a vehicle adopts a key groove structure, and a material on which a temperature has a little influence, such as metal, can be assembled. The present invention provides the shock-absorbing structure that is achieved only by the deformation (elastic force) of the key, and thus the shock-absorbing effect does not vary by an input force.

According to the above configuration, the positional relationship between the inner spline of the rotary shaft of the electric motor and the outer spline of the second rotary shaft can be retained in the specified position by the elastic force in the rotational direction of the positioning member. Accordingly, the shock-absorbing effect by the positioning member can be obtained. Thus, when the fluctuation in rotation is generated by the torque that is output by the drive source, it is possible to suppress the noise generated in the gear pair that is arranged upstream of the spline-fitting section in the torque transmission path.

According to the above configuration, the sliding of the positioning member in the rotational direction, which occurs when the electric motor outputs torque, is suppressed by the positioning member attachment section with which the shock-absorbing section of the positioning member is engaged. Accordingly, it is possible to suppress degradation of the shock-absorbing effect that occurs when the spline of the rotor shaft of the electric motor abuts against one side (one side in the rotational direction) of the spline of the second rotary shaft.

According to the above configuration, the sliding in the rotational direction of the positioning member, which occurs when the electric motor outputs torque, can be suppressed by both of the first and second positioning member attachment sections. Accordingly, it is possible to effectively suppress degradation of the shock-absorbing effect that occurs when the spline of the rotary shaft of the electric motor is stuck on one side (one side in the rotational direction) of the spline of the second rotary shaft.

According to the above configuration, the other one of the rotary shaft of the electric motor and the second rotary shaft can rotate together with the positioning member. In addition, it is possible by the positioning member attachment section to suppress the sliding in the rotational direction of the positioning member.

According to the above configuration, the size of the first space and the size of the second space can be set in accordance with the magnitude of the fluctuation in torque in the first rotational direction and the magnitude of the fluctuation in torque in the second rotational direction, which are output by the drive source. Accordingly, there is no need to unnecessarily increase the size of the first space and the size of the second space. Thus, it is possible to suppress degradation of the spline strength, which is caused by the unnecessary increase in the size of the first space and the size of the second space.

According to the above configuration, the projection of the spline of the second rotary shaft can be arranged (centered) (at the center) between the projection and the other projection of the spline of the rotary shaft in the electric motor. Accordingly, the size of the first space can substantially be equal to the size of the second space. As a result, the shock-absorbing effect whose magnitude is substantially equal in the first rotational direction and in the second rotational direction can be obtained.

According to the above configuration, when the magnitude of the fluctuation in torque in the first rotational direction and the magnitude of the fluctuation in torque in the second rotational direction, which are output by the drive source, are asymmetrical on the positive value side and the negative value side, the relatively large space (first space) is provided on the first rotation side on which the fluctuation in torque is large. Accordingly, there is no need to provide the unnecessarily large space (second space) on the second rotational direction side.

According to the above configuration, the positioning member, which is formed of the elastic member, can easily apply the elastic force to the rotary shaft of the electric motor and the second rotary shaft that make relative rotation with each other. Thus, the shock-absorbing effect can be improved.

The present invention can be used for the power transmission apparatus for a vehicle.

What is claimed is:

1. A power transmission apparatus for a vehicle, the power transmission apparatus comprising:

an electric motor includes a rotary shaft having an inner spline on an inner peripheral side of the rotary shaft of the electric motor;
a generator;
a first rotary shaft connected to an output shaft of a drive source and configured to integrally rotate with the output shaft of the drive source;
a second rotary shaft includes an outer spline on an outer peripheral side of the second rotary shaft, the outer spline of the second rotary shaft is spline-fitted to the inner spline of the rotary shaft of the electric motor to form a spline-fitting section; and
a third rotary shaft connected to both of the first rotary shaft and the second rotary shaft, the third rotary shaft coupled to a drive wheel, and the third rotary shaft connected to the second rotary shaft via a gear pair; and
a positioning member positioned between the rotary shaft of the electric motor and the second rotary shaft at a position other than the spline-fitting section, the positioning member configured to
  (i) apply an elastic force in a rotational direction to the rotary shaft of the electric motor and the second rotary shaft in a portion where the rotary shaft of the electric motor and the second rotary shaft overlap each other, and
  (ii) be arranged to set each of a position in the rotational direction of a spline of the rotary shaft of the electric motor and a position in the rotational direction of a spline of the second rotary shaft to a specified position, and
  (iii) apply the elastic force in the rotational direction to the rotary shaft of the electric motor and the second rotary shaft such that the spline of the rotary shaft of the electric motor and the spline the second rotary shaft are each restored to the specified position.

2. The power transmission apparatus according to claim 1, wherein
the positioning member is arranged so as to determine each of a position in the rotational direction of the inner spline of the rotary shaft in the electric motor and a position in the rotational direction of the outer spline of the second rotary shaft to a specified position, and the positioning member applies an elastic force in the rotational direction to the inner spline of the rotary shaft in the electric motor and the outer spline of the second rotary shaft such that the inner spline and the outer spline are each restored to the specified position.

3. The power transmission apparatus according to claim 2, wherein
the positioning member has a shock-absorbing section that extends along a radial direction of the rotary shaft, and at least one of a surface of the second rotary shaft and a surface of the rotary shaft of the electric motor that face each other includes a positioning member attachment section with which at least one of an end on an axis side along the radial direction of the shock-absorbing section and an end on an opposite side of the axis is engaged.

4. The power transmission apparatus according to claim 3, wherein
the positioning member has a ring section and the shock-absorbing section extends from a portion of the ring section along the axis side and the opposite side of the axis,
the rotary shaft of the electric motor includes a first positioning member attachment section, on an inner surface of the rotary shaft of the electric motor, with which the end on the opposite side of the axis of the shock-absorbing section is engaged, and
an outer peripheral surface of the second rotary shaft includes a second positioning member attachment section with which the end on the axis side of the shock-absorbing section is engaged.

5. The power transmission apparatus according to claim 4, wherein
the ring section of the positioning member is interposed for an entire periphery of the portion where the rotary shaft of the electric motor and the second rotary shaft overlap each other except for the spline-fitting section.

6. The power transmission apparatus according to claim 4, wherein
the ring section of the positioning member is interposed for an entire periphery of the portion where the rotary shaft of the electric motor and the second rotary shaft overlap each other except for the spline-fitting section.

7. The power transmission apparatus according to claim 3, wherein
the positioning member includes a ring section and the shock-absorbing section that projects from a portion of the ring section along one of the axis side and the opposite side of the axis,
one of an outer peripheral surface of the second rotary shaft and an inner peripheral surface of the rotary shaft of the electric motor includes the positioning member attachment section with which the shock-absorbing section is engaged, and
the ring section is press-fitted to another of the outer peripheral surface of the second rotary shaft and the inner peripheral surface of the rotary shaft of the electric motor.

8. The power transmission apparatus according to claim 2, wherein
the inner spline of the rotary shaft in the electric motor includes a first projection,
the outer spline of the second rotary shaft includes a second projection,
the first projection and the second projection are arranged via a first space and a second space between the first projection and the second projection,
the first projection and the second projection move to a side on which the size of the first space is reduced and abut against each other when the drive source drives the drive wheel in a first rotational direction,
the first projection and the second projection move to a side on which the size of the second space is reduced and abut against each other when the drive source drives the drive wheel in a second rotational direction that is opposite from the first rotational direction, and
the positioning member is arranged in a position where each of the size of the first space and the size of the second space is set to a specified size, and the positioning member applies the elastic force in the rotational direction to the rotary shaft of the electric motor and the second rotary shaft such that the rotary shaft of the electric motor and the second rotary shaft are restored to a position where the size of the first space and the size of the second space each becomes the specified size when the drive source drives the drive wheel in one of the first rotational direction or the second rotational direction.

9. The power transmission apparatus according to claim 8, wherein
the positioning member is arranged in a position where the size of the first space becomes substantially equal to the size of the second space, the first space and the second space being defined between the spline of the rotary shaft of the electric motor and the spline of the second rotary shaft, and the positioning member applies the elastic force in the rotational direction to the rotary shaft of the electric motor and the second rotary shaft such that the rotary shaft of the electric motor and the second rotary shaft are each restored to a position where the size of the first space becomes substantially equal to the size of the second space.

10. The power transmission apparatus according to claim 8, wherein, the positioning member is arranged in a position where the first space becomes larger than the second space when a fluctuation in output torque at a time when the drive source drives the drive wheel in the first rotational direction is larger than a fluctuation in output torque at a time when the drive source drives the drive wheel in the second rotational direction, and the positioning member applies the elastic force in the rotational direction to the rotary shaft of the electric motor and the second rotary shaft such that the rotary shaft of the electric motor and the second rotary shaft are each restored to a position where the size of the first space becomes larger than the size of the second space.

11. The power transmission apparatus according to claim 1, wherein the positioning member is an elastic member that applies the elastic force in the rotational direction to the rotary shaft of the electric motor and the second rotary shaft such that a spline of the rotary shaft of the electric motor and a spline of the second rotary shaft are each restored to a specified position in the rotational direction.

* * * * *